United States Patent
Li et al.

(10) Patent No.: US 12,505,624 B2
(45) Date of Patent: Dec. 23, 2025

(54) METHOD AND APPARATUS FOR PRESENTING OBJECT ANNOTATION INFORMATION, ELECTRONIC DEVICE, AND STORAGE MEDIUM

(71) Applicant: HUAWEI TECHNOLOGIES CO., LTD., Guangdong (CN)

(72) Inventors: Weiyang Li, Wuhan (CN); Hao Yang, Wuhan (CN); Zehui Kang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 175 days.

(21) Appl. No.: 18/307,386

(22) Filed: Apr. 26, 2023

(65) Prior Publication Data

US 2023/0260218 A1    Aug. 17, 2023

Related U.S. Application Data

(63) Continuation of application No. PCT/CN2021/118121, filed on Sep. 14, 2021.

(30) Foreign Application Priority Data

Oct. 30, 2020 (CN) .......................... 202011191117.4

(51) Int. Cl.
  *G06T 19/00* (2011.01)
  *G06T 17/05* (2011.01)
(52) U.S. Cl.
  CPC .............. *G06T 19/00* (2013.01); *G06T 17/05* (2013.01); *G06T 2219/004* (2013.01)
(58) Field of Classification Search
  CPC .... G06T 19/00; G06T 17/05; G06T 2219/004
  See application file for complete search history.

(56) References Cited

U.S. PATENT DOCUMENTS

| 8,196,091 B2 * | 6/2012 | Gutz | ........................ G06F 8/51 717/104 |
| 2014/0267393 A1 * | 9/2014 | Mitchell | ................. G06T 11/60 345/632 |

(Continued)

FOREIGN PATENT DOCUMENTS

| CN | 109446607 A | 3/2019 |
| CN | 109582122 A | 4/2019 |
| CN | 109974733 A | 7/2019 |

OTHER PUBLICATIONS

Huang et al., "Virtual ads insertion in street building views for augmented reality," Proceedings of 2011 18th IEEE International Conference on Image Processing, Sep. 11, 2011, pp. 1117-1120.

(Continued)

*Primary Examiner* — Abderrahim Merouan
(74) *Attorney, Agent, or Firm* — Fish & Richardson P.C.

(57) ABSTRACT

This application relates to methods and apparatuses for presenting object annotation information. An example method includes: obtaining a target object in a specified scene, where the specified scene is a scene presented at a target location; and presenting annotation information of the target object on an annotation facade that is of the target object and that is presented on a display interface, where the annotation facade is determined from at least two visible facades of the target object based on projection regions that are for the at least two visible facades and that are presented on the display interface, and the visible facade is a facade visible to the target location in exterior facades of the target object.

20 Claims, 16 Drawing Sheets

701

702

703

Visible region of a facade

Blocked region

Non-adjacent line segment

(56) References Cited

U.S. PATENT DOCUMENTS

| | | | |
|---|---|---|---|
| 2016/0187654 A1* | 6/2016 | Border | G02B 27/0172 |
| | | | 359/630 |
| 2017/0276497 A1* | 9/2017 | Andrew | G01C 21/3423 |
| 2017/0309049 A1* | 10/2017 | Law | H04N 13/275 |
| 2020/0234498 A1* | 7/2020 | Price | G06T 7/12 |

OTHER PUBLICATIONS

Maass et al., "Seamless Integration of Labels into Interactive Virtual 3D Environments Using Parameterized Hulls," Proceedings of the Fourth Eurographics Conference on Computational Aesthetics in Graphics, Visualization, and Imaging, Jun. 18, 2008, 8 pages.

Chen et al., "Automated positioning of 3D virtual scene in AR-based assembly and disassembly guiding system," International Journal of Advanced Manufacturing Technology, vol. 76, No. 5, Sep. 6, 2014, pp. 753-764.

Extended European Search Report in European Appln. No. 21884791.1, mailed on Mar. 25, 2024, 7 pages.

\* cited by examiner

| | Visible region of a facade |
| | Blocked region |
| ------ | Non-adjacent line segment |

METHOD AND APPARATUS FOR PRESENTING OBJECT ANNOTATION INFORMATION, ELECTRONIC DEVICE, AND STORAGE MEDIUM

CROSS-REFERENCE TO RELATED APPLICATIONS

This application is a continuation of International Application No. PCT/CN2021/118121, filed on Sep. 14, 2021, which claims priority to Chinese Patent Application No. 202011191117.4, filed on Oct. 30, 2020. The disclosures of the aforementioned applications are hereby incorporated by reference in their entireties.

TECHNICAL FIELD

This application relates to the field of computer vision, and in particular, to a method and an apparatus for presenting object annotation information, an electronic device, and a storage medium.

BACKGROUND

With the continuous development of intelligent terminals, a user can obtain information about ambient buildings by using an AR map based on a location in a current scene, to facilitate direction selection of the user.

In a related technology, a developer usually presets, for a model corresponding to a building on the AR map, an information annotation corresponding to the building. When the building or POI information in the current scene of the user is identified, a location corresponding to the building or the POI information is used to display, on the AR map on a user terminal, the static information annotation on the model for the building. The annotation may be a three-dimensional annotation, and the user may clearly view annotation content corresponding to the building from a specific angle.

However, in the related technology, an information annotation of a three-dimensional building is static, and annotation display effect is poor.

SUMMARY

Embodiments of this application provide a method and an apparatus for presenting object annotation information, an electronic device, and a storage medium, so that an annotation facade can be selected based on a projection of a visible facade on a display interface of a specified scene, thereby improving display effect of annotation information. The technical solution is as follows.

In one aspect, a method for presenting object annotation information is provided. The method includes:
  obtaining a target object in a specified scene, where the specified scene is a scene presented at a target location; and
  presenting annotation information of the target object on an annotation facade that is of the target object and that is presented on a display interface, where the annotation facade is determined from at least two visible facades of the target object based on projection regions presented by the at least two visible facades on the display interface, and the visible facade is a facade visible to the target location in exterior facades of the target object.

In the solution provided in this embodiment of this application, the visible facade of the target object is a facade that can be seen in exterior facades of the target object when the target object is presented at the target location. In other words, the visible facade is a facade that is not completely blocked when the target object is presented in the specified scene corresponding to the target location. The projection region is a region presented on the display interface for the visible facade corresponding to the target object. The target object may be presented in the specified scene corresponding to the target location. The projection region that is of the visible facade of the target object and that is projected on the display interface is obtained. One of visible facades is determined as the annotation facade based on projection regions. The annotation information of the target object is presented on the annotation facade. In other words, one of the visible facades corresponding to the target object may be selected as the annotation facade based on the target location, to present the annotation information of the target object. The annotation information is presented based on a location relationship between the target location and the facade of the target object. In this way, display effect of the annotation information is improved.

In a possible implementation, the specified scene is an augmented reality scene or a virtual reality scene presented at the target location.

In the solution provided in this embodiment of this application, in an augmented reality scene, the target location may be a location of an augmented reality device, and the augmented reality scene is a scene obtained by the augmented reality device at a current location by using an image acquiring component corresponding to the augmented reality device. However, in the virtual reality scene, the target location may be a location of a virtual character corresponding to a virtual reality device in a three-dimensional virtual scene modeled through background calculation performed by the virtual reality device. The virtual reality scene is a corresponding three-dimensional virtual scene presented by the virtual reality device based on a viewing angle and a location corresponding to the virtual character.

In a possible implementation, the annotation facade is one facade that is in the at least two visible facades and whose projection region presented on the display interface has a largest area.

One facade that is in the visible facades corresponding to the target object and that has a largest projection region on the display interface is used as the annotation facade to display the annotation information, so that the annotation information corresponding to the annotation facade can be presented in a maximum size when the annotation information is presented on the display interface. This improves display effect of the annotation information.

In a possible implementation, the method further includes:
  obtaining to-be-projected regions of the at least two visible facades based on visible regions of the at least two visible facades, where the visible region is a region that is of a corresponding visible facade and that is visible to the target location in the specified scene; and
  projecting the to-be-projected regions of the at least two visible facades to the display interface, and obtaining projection regions that are for the visible regions of the at least two visible facades and that are presented on the display interface.

According to the solution provided in this embodiment of this application, the visible region refers to a visible region on the visible facade that is of the target object and that corresponds to the projection region on the display interface.

In other words, the visible region on the visible facade is a region on the visible facade of the target object in the three-dimensional scene presented in the virtual reality scene, or a region on the visible facade of the target object in a three-dimensional scene calculated by a background computer for the augmented reality scene. Both the visible region and the to-be-projected region are regions on the visible facade. The to-be-projected region may be all or a part of the visible region on the visible facade. In other words, the visible region corresponding to the visible facade may be completely projected to the display interface, or a part of the visible facade is projected to the display interface. The projection region on the display interface may be presented on a projection screen based on the to-be-projected region of any shape. In this case, to select the annotation facade based on the projection region, an appropriate annotation facade may be selected based on annotation information of any shape, thereby improving display effect of the annotation facade.

In a possible implementation, the obtaining to-be-projected regions of the at least two visible facades based on visible regions of the at least two visible facades includes:
  obtaining all the visible regions of the at least two visible facades, where all the visible regions are used as the to-be-projected regions of the at least two visible facades.

In a possible implementation, the presenting annotation information of the target object on an annotation facade that is of the target object and that is presented on a display interface includes:
  determining an annotation region in the visible region of the annotation facade, where the annotation region is a region of a first shape with a largest area included in the visible region of the annotation facade; and
  presenting the annotation information of the target object in the annotation region of the annotation facade presented on the display interface.

In the solution provided in this embodiment of this application, the annotation region is the region of the first shape with the largest area in the visible region of the annotation facade, that is, the annotation region is all or a part of the visible region corresponding to the annotation facade.

In a possible implementation, the determining an annotation region in the visible region of the annotation facade includes:
  obtaining blockage information of the annotation facade, where the blockage information indicates a blocked vertex and a blocked edge of the annotation facade; and
  determining the annotation region in the visible region of the annotation facade based on the blockage information.

In the solution provided in this embodiment of this application, the blockage information is information corresponding to a part that is not presented when the annotation facade is projected on the display interface, that is, information corresponding to a region other than the visible region in the annotation facade. A blocked vertex is a vertex located outside the visible region of the annotation facade, and a blocked edge is an entire edge located outside the visible region of the annotation facade.

In a possible implementation, the first shape is a rectangle, and the determining the annotation region in the visible region of the annotation facade based on the blockage information includes:
  when the blockage information indicates that a vertex of the annotation facade is blocked, using a diagonal vertex of the blocked vertex as a first target point;
  determining a first endpoint on a non-adjacent edge corresponding to the first target point, so that a rectangle that uses a line segment between the first endpoint and the first target point as a diagonal is a rectangle with a largest area in the visible region of the annotation facade; and
  determining, as the annotation region, a region in which the rectangle that uses the line segment between the first endpoint and the first target point as the diagonal is located.

In the solution provided in this embodiment of this application, the annotation region presenting the annotation information is a rectangle, and one vertex is blocked when the annotation facade determined based on the projection region is presented on the display interface. In this case, the first endpoint of the rectangle corresponding to the annotation region may be determined based on a non-adjacent edge of a diagonal vertex of the blocked vertex. The annotation region is determined based on the first endpoint and the diagonal vertex of the blocked vertex. The non-adjacent edge is an edge not directly connected to the first endpoint when the visible region of the annotation facade that corresponds to the projection region is in a corresponding shape.

In a possible implementation, the first shape is a rectangle, and the determining the annotation region in the visible region of the annotation facade based on the blockage information includes:
  when the blockage information indicates that two vertices of the annotation facade are blocked, and an edge between the two blocked vertices is completely blocked, obtaining, in unblocked vertices of the annotation facade, a vertex with a largest total of lengths of unblocked parts of adjacent edges, where the obtained vertex is used as a second target point;
  determining a second endpoint on a non-adjacent edge corresponding to the second target point, where the second endpoint is in the visible region of the annotation facade, and a rectangle that uses a line segment between the second endpoint and the second target point as a diagonal is a rectangle with a largest area in the visible region of the annotation facade; and
  determining, as the annotation region, a region in which the rectangle that uses the line segment between the second endpoint and the second target point as the diagonal is located.

In a possible implementation, the first shape is a rectangle, and the determining the annotation region in the visible region of the annotation facade based on the blockage information includes:
  obtaining a target point set when the blockage information indicates that two vertices of the annotation facade are blocked and there is no completely blocked edge, where the target point set includes an unblocked vertex of the annotation facade and boundary points on adjacent edges of the two blocked vertices, and the boundary point is used to divide a blocked region and an unblocked region of the visible facade;
  determining a third endpoint in the visible region of the annotation facade, where a rectangle using a line segment between the third endpoint and a third target point as a diagonal is a rectangle with a largest area in the visible region of the annotation facade, and the third target point is one target point in the target point set; and determining, as the annotation region, a region in which the rectangle that uses the line segment between the third endpoint and the third target point as the diagonal is located.

In a possible implementation, the first shape is a rectangle, and the determining the annotation region in the visible region of the annotation facade based on the blockage information includes:

when the blockage information indicates that three vertices of the annotation facade are blocked, obtaining an unblocked vertex of the annotation facade, where the unblocked vertex is used as a fourth target point; and determining, as the annotation region, a region in which a rectangle formed by the fourth target point and boundary points on two adjacent edges of the fourth target point is located, where the boundary point is used to divide a blocked region and an unblocked region of the visible facade.

In a possible implementation, the presenting annotation information of the target object on an annotation facade that is of the target object and that is presented on a display interface includes:

generating a three-dimensional model of the annotation information based on a size of the annotation region; and presenting the three-dimensional model of the annotation information on a parallel plane of the annotation region that is presented on the display interface, where the parallel plane is a plane in front of the annotation facade and parallel to the annotation facade.

In the solution provided in this embodiment of this application, the annotation information may be presented on the display interface in a form of a three-dimensional model, and a size of the three-dimensional model for the annotation information may be determined based on a size of the annotation region. Because the three-dimensional model has depth information, a plane that is in front of the annotation facade and that is parallel to the annotation facade needs to be obtained first. The annotation information is on the parallel plane. Based on a location of the parallel plane and the size of the three-dimensional model for the annotation information, the three-dimensional model for the annotation information is presented on the display interface. In this case, the annotation information presented on the display interface has characteristics of three dimensions, thereby improving display effect of the annotation information.

In a possible implementation, the obtaining to-be-projected regions of the at least two visible facades based on visible regions of the at least two visible facades includes:

determining respective candidate annotation regions from the visible regions of the at least two visible facades, where the candidate annotation region is a region of a second shape with a largest area in a visible region of a corresponding facade; and obtaining the respective candidate annotation regions of the at least two visible facades, where the respective candidate annotation regions are used as the to-be-projected regions of the at least two visible facades.

In a possible implementation, the presenting annotation information of the target object on an annotation facade that is of the target object and that is presented on a display interface includes:

presenting the annotation information of the target object in a candidate annotation region corresponding to the annotation facade presented on the display interface.

In the solution provided in this embodiment of this application, in the visible regions of the at least two visible facades of the target object, respective regions of a second shape with a largest area in the visible regions are obtained and used as the to-be-projected regions. In other words, a part of the visible region is used as the to-be-projected region, and is projected to the display interface. A candidate annotation region corresponding to a projection region with a largest area on the display interface is used as a region for annotation information presentation. To be specific, projection areas, on the display interface, that correspond to largest regions that are in a specific shape and that are of all the visible facades are compared. A candidate annotation region of a visible facade corresponding to the largest projection region is used for annotation information presentation. Based on the largest areas in the specific shape that are of all the visible facades and that are projected on the display interface, a largest information annotation of a specific shape can be presented on the display interface, thereby improving an annotation information display effect.

In a possible implementation, the presenting annotation information of the target object on an annotation facade that is of the target object and that is presented on a display interface includes:

when an area of a projection region that is presented on the display interface and that is for the visible region of the annotation facade is greater than a specified area threshold, presenting the annotation information of the target object on the annotation facade presented on the display interface.

In another aspect, an apparatus for presenting object annotation information is provided. The apparatus includes:

a target object obtaining unit, configured to obtain a target object in a specified scene, where the specified scene is a scene presented at a target location; and an annotation information presentation unit, configured to present annotation information of the target object on an annotation facade that is of the target object and that is presented on a display interface, where the annotation facade is determined from at least two visible facades of the target object based on projection regions that are for the at least two visible facades and that are presented on the display interface, and the visible facade is a facade visible to the target location in exterior facades of the target object.

In still another aspect, an electronic device is provided. The electronic device includes a processor and a memory, the memory stores computer instructions, and the computer instructions are loaded and executed by the processor to implement the method for presenting object annotation information.

In yet another aspect, a computer-readable storage medium is provided. The storage medium stores at least one instruction, program, code set, or instruction set. The at least one instruction, program, code set, or instruction set is loaded and executed by a processor to implement the foregoing method for presenting object annotation information.

In still yet another aspect, a computer program product or a computer program is provided. The computer program product or the computer program includes computer instructions, and the computer instructions are stored in a computer-readable storage medium. A processor of a terminal reads the computer instructions from the computer-readable storage medium. The processor executes the computer instructions, so that the terminal performs the foregoing method for presenting object annotation information.

The technical solutions provided in this application may have the following beneficial effect.

A visible facade in exterior facades of a target object is obtained in a virtual reality scene or an augmented reality scene; an annotation facade is determined from visible facades of the target object based on projections of the visible facades on a display interface; and annotation information of the target object is presented in a region corresponding to a visible region of the annotation facade. According to the foregoing solutions, when an annotation of the target object is displayed, the annotation facade may be selected based on a target location and a projection of a visible facade on a display interface of a specified scene. Therefore, in the specified scene, a facade with a larger visible region is flexibly selected to display the annotation information, thereby improving display effect of the annotation information.

It should be understood that the foregoing general descriptions and the following detailed descriptions are only examples and explanatory, and do not limit this application.

BRIEF DESCRIPTION OF DRAWINGS

The accompanying drawings herein are incorporated into the specification and constitute a part of the specification, show embodiments conforming to this application, and are used together with the specification to explain a principle of this application.

DESCRIPTION OF EMBODIMENTS

Figure 1:
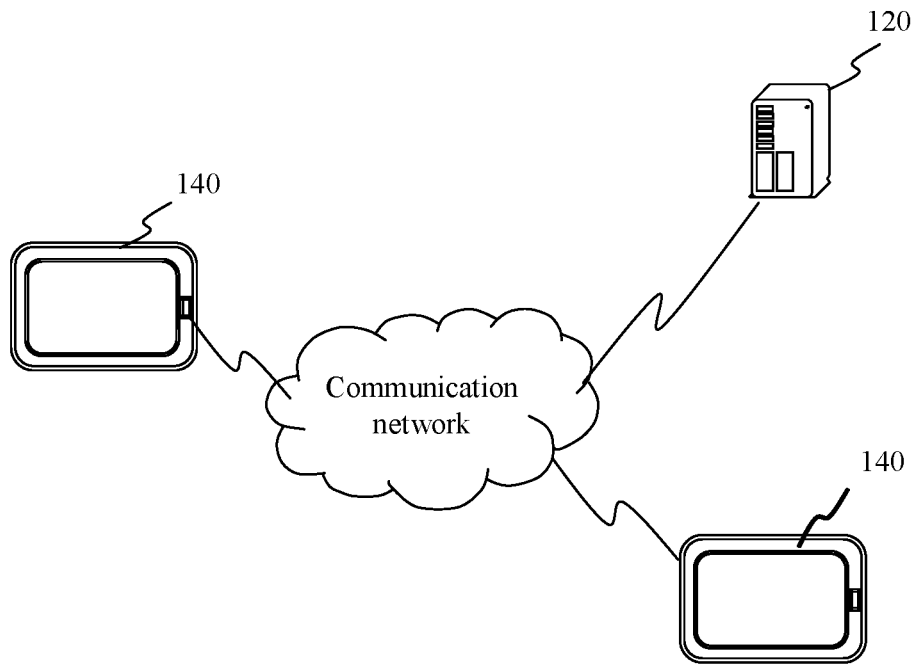
FIG. 1 is a schematic diagram of a structure of a system for presenting object annotation information according to an example embodiment.

Example embodiments are described in detail herein, and examples are shown in the accompanying drawings. When the following descriptions relate to the accompanying drawings, unless specified otherwise, same numbers in different accompanying drawings represent a same or similar element. Implementations described in the following example embodiments do not represent all implementations consistent with this application. On the contrary, the implementations are only examples of apparatuses and methods that are described in the appended claims in detail and that are consistent with some aspects of this application.

Before the embodiments shown in this application are described, several concepts in this application are first described.

(1) Computer Vision (CV)

Computer vision is a science that deals with how to make machines "see" things. Computer vision is machine vision in which cameras and computers instead of human eyes are used for identifying, tracking and measuring targets. In computer vision, graphics processing is further performed, so that the computer can process graphics into images suitable for human eyes for observation, or images transmitted to devices for detection. Vision is integral to various intelligent/autonomous systems used in various application fields, such as manufacturing, inspection, document analysis, medical diagnosis, and military. A challenge in computer vision is to equip computers and robots with vision that can rival vision of human eyes. In machine vision, image signals, texture and color modeling, geometric processing and inference, and object modeling are required.

(2) Augmented Reality (AR, Augmented Reality)

Augmented reality is a technology that combines virtual information with the real world. Augmented reality applies a plurality of technologies, such as multimedia, 3D modeling, real-time tracking and registration, intelligent interaction, and sensor technologies, to apply simulated virtual information generated by a computer, such as texts, images, 3D models, music, and videos to the real world. The two types of information are complementary, to "enhance" the real world. The augmented reality technology is a new technology that promotes integration of real-world information and virtual-world information. In the augmented reality technology, stimulation and overlay are performed with technologies, such as computer technologies, to effectively apply virtual information in the real word together with entity information that cannot be easily experienced in space of the real world. In this process, virtual information can be perceived by human senses. In this way, a user can have a sensory experience beyond reality.

(3) Virtual Reality (Virtual Reality, VR)

Virtual reality technology, also referred to as "Vivision" technology, is a brand-new practical technology that has developed in the 20th century. The virtual reality technology integrates computer, electronic information, and simulation technologies. A basic implementation of the virtual reality technology is that a computer simulates a virtual environment, to immerse a user in the environment. The virtual reality (VR) technology is a computer simulation system that can create and be used to experience a virtual world. The VR technology generates a simulated environment by using a computer, to give a user an immersive feel of the environment. The virtual reality technology combines data in real life with various output devices by using electronic signals generated by using computer technologies, so that the data can be converted into phenomena that can be perceived by a user. These phenomena may be true objects in real life or substances that are invisible to naked eyes, and are represented by three-dimensional models.

FIG. 1 is a schematic diagram of a structure of a system for presenting object annotation information according to an example embodiment. The system includes a server 120 and a user terminal 140.

The server 120 may include one server or several servers; or the server 120 may be a virtualization platform, a cloud computing service center, or the like. This is not limited in this application.

The user terminal 140 may be a terminal device having a display function, or may be a terminal device having a VR or AR function. For example, the user terminal may be a wearable device (for example, VR glasses, AR glasses, or smart glasses), a mobile phone, a tablet computer, or an e-book reader. A quantity of user terminals 140 is not limited.

A client may be installed in the user terminal 140, and the client may be a three-dimensional map client, an instant messaging client, a browser client, or the like. A client software type is not limited in embodiments of this application.

The user terminal 140 is connected to the server 120 by a communication network. Optionally, the communication network is a wired network or a wireless network.

In this embodiment of this application, the server 120 may send three-dimensional modeling data of a target object to the user terminal 140. Based on the three-dimensional modeling data, the user terminal 140 performs three-dimensional modeling of the target object in a VR scenario, or performs three-dimensional modeling of the target object in a computer background corresponding to an AR scenario.

Optionally, the wireless network or the wired network uses a standard communication technology and/or protocol. The network is usually the Internet, but may also be any other network, including but not limited to a local area network (Local Area Network, LAN), a metropolitan area network (Metropolitan Area Network, MAN), a wide area network (Wide Area Network, WAN), a mobile network, a wired or wireless network, a private network, or a virtual private network, or any combination thereof. In some embodiments, techniques and/or formats including Hyper-Text Markup Language (HyperText Markup Language, HTML), Extensible Markup Language (Extensible Markup Language, XML), and the like are used to represent data exchanged over a network. In addition, all or some links may be encrypted by using conventional encryption technologies such as Secure Socket Layer (Secure Socket Layer, SSL), Transport Layer Security (Transport Layer Security, TLS), Virtual Private Network (Virtual Private Network, VPN), and Internet Protocol Security (Internet Protocol Security, IPsec). In some other embodiments, a customized and/or dedicated data communication technology may be used to replace or supplement the foregoing data communication technology.

Figure 2:
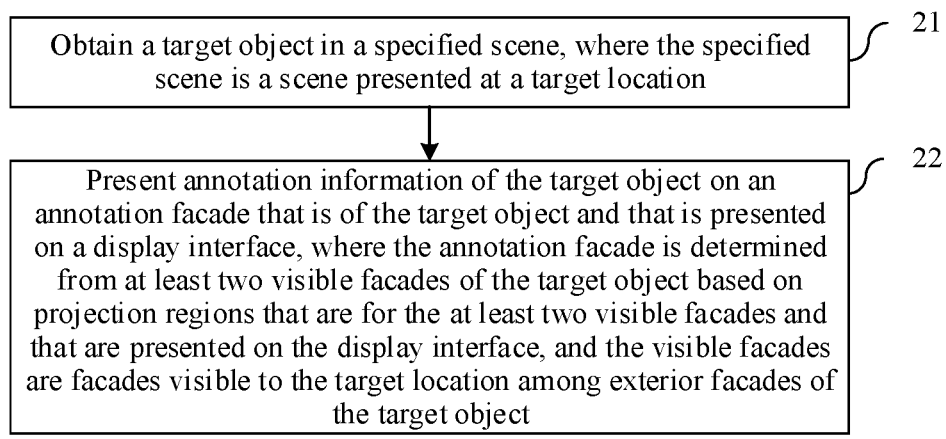
FIG. 2 is a schematic flowchart of a method for presenting object annotation information according to an example embodiment.

Refer to FIG. 2. FIG. 2 is a schematic flowchart of a method for presenting object annotation information according to an example embodiment. The method may be executed by an electronic device. The electronic device may be a terminal or a server. Alternatively, the electronic device may include a terminal and a server. The terminal may be the user terminal 140 in the embodiment shown in FIG. 1. The server may be the server 120 in the embodiment shown in FIG. 1. As shown in FIG. 2, a procedure of the method for presenting object annotation information may include the following steps.

Step 21: Obtain a target object in a specified scene, where the specified scene is a scene presented at a target location.

In a possible implementation, the specified scene is an augmented reality scene or a virtual reality scene presented at the target location.

In a possible implementation, the augmented reality scene or the virtual reality scene may be a scene presented on a display device corresponding to the user terminal.

Step 22: Present annotation information of the target object on an annotation facade that is of the target object and that is presented on a display interface, where the annotation facade is determined from at least two visible facades of the target object based on projection regions that are for the at least two visible facades and that are presented on the display interface, and the visible facade is a facade visible to the target location in exterior facades of the target object.

In an example solution, the scene presented at the target location may be a presented scene corresponding to the target location. In other words, an image of the scene presented on the display interface is an image obtained by observing the specified scene from a view at the target location.

The annotation facade is a facade that is in visible facades corresponding to the target object and that is used to display the annotation information of the target object. The annotation information may be text annotation information, image annotation information, video annotation information, and annotation information in any form that is used to display information. The annotation information may be two-dimensional annotation information or three-dimensional annotation information. This is not limited in this application.

In conclusion, in the solution shown in this embodiment of this application, the visible facade in the exterior facades of the target object is obtained in the virtual reality scene or the augmented reality scene; the annotation facade is determined from the visible facades of the target object based on projections of the visible facades on the display interface; and the annotation information of the target object is presented in a region corresponding to a visible region of the annotation facade. According to the solution, when the annotation of the target object is displayed, the annotation facade may be selected based on the target location and the projection of the visible facade on the display interface of the specified scene. Therefore, in the virtual reality/augmented reality scene, a facade with a larger visible region is flexibly selected to display the annotation information, thereby improving display effect of the annotation information.

Figure 3:
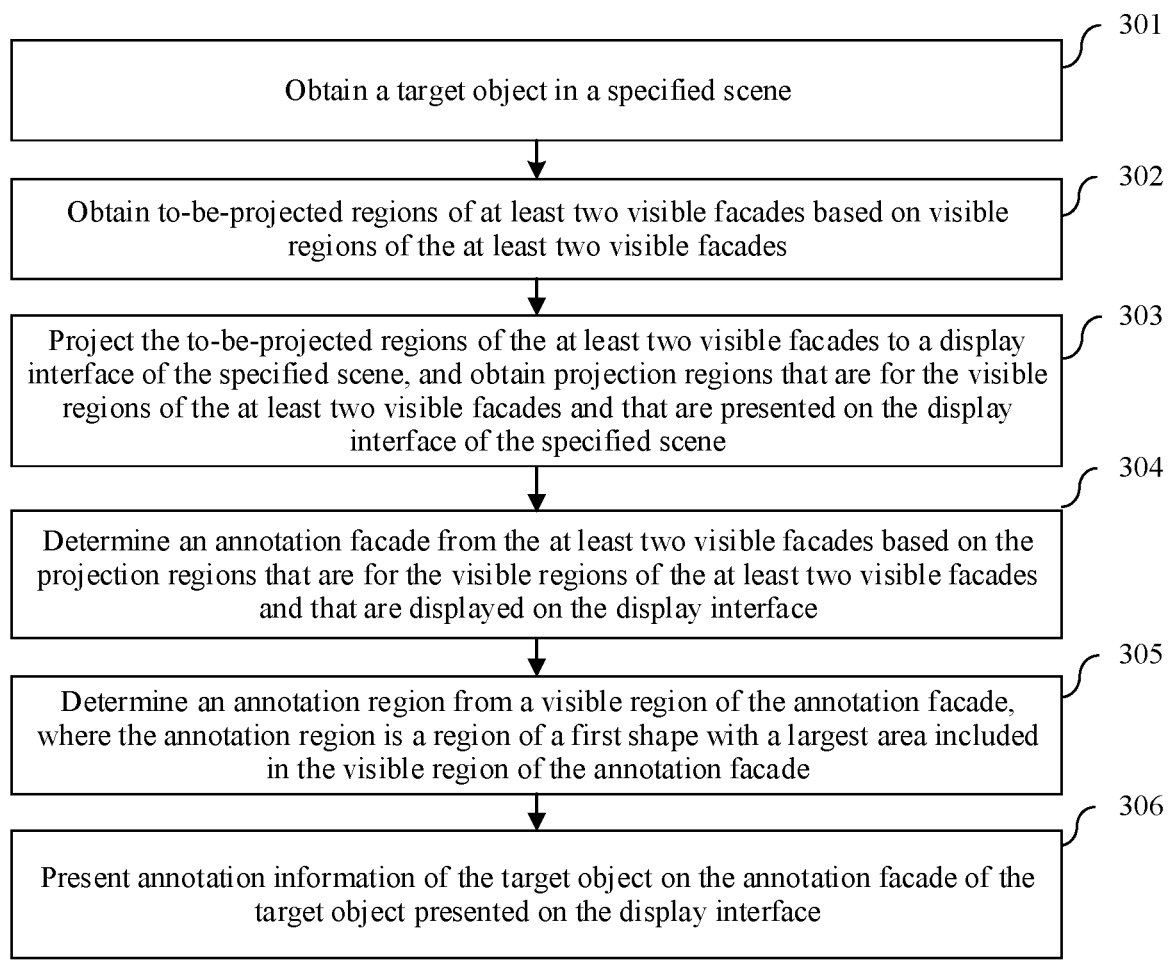
FIG. 3 is a flowchart of a method for presenting object annotation information according to an example embodiment.

Refer to FIG. 3. FIG. 3 is a flowchart of a method for presenting object annotation information according to an example embodiment. The method may be executed by an electronic device. The electronic device may be a terminal or a server. Alternatively, the electronic device may include a terminal and a server. The terminal may be the user terminal 140 in the embodiment shown in FIG. 1. The server may be the server 120 in the embodiment shown in FIG. 1. As shown in FIG. 3, a VR map or an AR map application scenario in which a building is a target object is used as an example, and a procedure of a method for presenting object annotation information may include the following steps.

Step 301: Obtain a target object in a specified scene.

The specified scene is a scene presented at the target location.

In a possible implementation, the specified scene is an augmented reality scene or a virtual reality scene presented at the target location.

In a possible implementation, when the specified scene is an AR scene, the target location may be a location of an AR device. The location may be an absolute location. For example, when the AR device is used in an AR map, the AR device may obtain current positioning information of the device, to obtain an absolute location corresponding to the AR device. The location may alternatively be a relative location. For example, when the AR device is used indoors, information about a location of the AR device relative to a point in an indoor environment may be obtained, so as to obtain the location of the AR device relative to the point in the indoor environment.

In a possible implementation, when the specified scene is a VR scene, the target location may alternatively be a location that corresponds to a virtual role or a virtual camera corresponding to a VR device in a virtual three-dimensional scene constructed by the VR device. In this case, each point in the virtual three-dimensional scene may have coordinates, and information corresponding to the target location may be obtained based on coordinate data.

In a possible implementation, a visible facade of the target object is a visible facade in exterior facades of the target object when the target object is presented at the target location.

A visible region refers to a region of a visible part on a visible facade that is in visible facades of the target object and that corresponds to a projection region presented on the display interface.

In a possible implementation, when the specified scene is a VR scene or an AR scene, a three-dimensional model corresponding to the target object is constructed based on three-dimensional model data corresponding to the target object.

In a possible implementation, when the specified scene is a VR scene, a three-dimensional model corresponding to the object is constructed in the VR scene based on three-dimensional model data corresponding to the target object. When the specified scene is an AR scene, a three-dimensional model corresponding to the object is constructed based on three-dimensional model data corresponding to the target object in a computer background corresponding to the AR scene.

The three-dimensional data corresponding to the target object may include size information, coordinate information, and the like of the target object.

In a possible implementation, visible regions of at least two visible facades of the target object in the specified scene are obtained.

In a possible implementation, a minimum bounding box corresponding to the target object is obtained based on the three-dimensional model of the target object and the three-dimensional data corresponding to the three-dimensional model of the target object. The minimum bounding box is a smallest circumscribed cuboid of the target object, and the minimum bounding box corresponding to the target object is used as an approximate model of the target object. In this case, when an external shape of the target object is complex, corresponding calculation of the target object is implemented by using the approximate model, so that a calculation amount can be effectively reduced.

In a possible implementation, a facade corresponding to the minimum bounding box of the target object is obtained and used as a facade corresponding to the target object.

In a possible implementation, a normal vector of each exterior facade of the target object in the specified scene is obtained. In the exterior facades of the target object, when an inner product of a normal vector of an exterior facade and a vector corresponding to the display interface of the specified scene is a positive value, the exterior facade is used as the visible facade.

In a possible implementation, the vector corresponding to the display interface of the specified scene may be a normal vector corresponding to the display interface of the specified scene.

In a possible implementation, the display interface of the specified scene may be a user observation interface simulated in the specified scene by using a virtual camera, that is, the display interface of the specified scene may be a corresponding scene obtained when a user performs observation by using a terminal. For example, the specified scene is an AR map. A user terminal obtains real-time location information, and obtains, based on an AR map client, three-dimensional building model information of an ambient environment corresponding to a target location at this time. In this case, the display interface of the specified scenario is an interface of a building in a corresponding orientation displayed on the user terminal. A vector corresponding to the display interface of the specified scene is a vector in a direction in which the user terminal faces.

On the display interface of the specified scene, the terminal may display, based on a current direction in which the terminal faces, a building model corresponding to the direction. Based on an inner product of a normal vector of each exterior facade corresponding to the building model and a direction vector in the direction corresponding to the display interface of the specified scene, the terminal can determine a relationship between the exterior facade and a user location, so as to determine whether the exterior facade is visible from a user's angle.

In a possible implementation, the visible region of the visible facade may be determined based on a line connecting the target location and each point on the visible facade.

For example, in the three-dimensional model constructed based on the three-dimensional model data of the ambient environment of the target location, several points on a visible facade in the three-dimensional model corresponding to the target object may be obtained from the three-dimensional model corresponding to the target object. The several points are separately connected to the target location. When there is no three-dimensional model corresponding to another building in a connection line between one of the points and the target location, a location corresponding to the point is determined as a visible region. When there is a three-dimensional model corresponding to another building in a connection line between one of the points and the target location, it indicates that the connection line corresponding to the point and the target location is blocked by the building. Therefore, the point may be determined as an invisible region corresponding to the target location. Based on several visible region points and invisible region points, the visible region of the visible facade may be obtained.

In a possible implementation, the visible region of the visible facade may be determined based on a boundary point of the target location and each point on the visible facade.

The boundary point is a point on an edge of the visible facade, and is used to divide the visible region and the invisible region.

Step 302: Obtain to-be-projected regions of the at least two visible facades based on the visible regions of the at least two visible facades.

The visible region is a region that is of a corresponding visible facade and that is visible to the target location in the specified scene.

In a possible implementation, all the visible regions of the at least two visible facades are obtained and used as to-be-projected regions of the at least two visible facades.

Step 303: Project the to-be-projected regions of the at least two visible facades to the display interface of the specified scene, and obtain projection regions that are for the visible regions of the at least two visible facades and that are presented on the display interface of the specified scene.

In a possible implementation, a normal vector of the display interface of the specified scene is obtained, and the projection regions that are for the visible regions of the at least two visible facades and that are presented on the display interface of the specified scene are obtained based on included angles between normal vectors of the visible facades and the normal vector of the display interface.

In other words, the visible regions corresponding to the at least two visible facades are projected in a direction corresponding to a display interface of a specified scene. To be specific, when the visible facade is not parallel to the display interface of the specified scene, that is, when there is an included angle between the visible facade and the display interface of the specified scene, the visible region corresponding to the visible facade may be projected based on an included angle value corresponding to the normal vector of the visible facade and the display interface normal vector in a direction corresponding to the display interface of the specified scene that is directly viewed by the user.

Step 304: Determine an annotation facade from the at least two visible facades based on the projection regions that are for the visible regions of the at least two visible facades and that are presented on the display interface.

In a possible implementation, the annotation facade is one facade that is in the at least two visible facades and whose projection region presented on the display interface has a largest area.

When a projection region that is presented on the display interface of the specified scene and that is for a visible region corresponding to a visible facade is the largest, that is, when a visible area of the facade viewed from the user's angle is the largest, the facade may be set as the annotation facade.

In a possible implementation, areas of the visible regions of the at least two visible facades are obtained. Based on the areas of the visible regions of the at least two visible facades and a direction relationship between the at least two visible facades and the display interface of the specified scene, areas of the projection regions that are for the visible regions of the at least two visible facades and that are presented on the display interface of the specified scene are obtained.

In a possible implementation, blockage information of the at least two visible facades is obtained, where the blockage information indicates a blocked vertex and a blocked edge of the at least two visible facades; and the areas of the visible regions of the at least two visible facades are obtained based on the blockage information.

To obtain the area of the visible region of the visible facade, an approximate visible region of the visible facade may be obtained based on a quantity of blocked vertices and blocked edges of the visible facade. The area of the visible region of the visible facade is obtained based on the approximate visible region.

In a possible implementation, when no vertices of the visible facade are blocked, an area of the visible facade is the area of the visible region of the visible facade.

When no vertices of the visible facade are blocked, it may be considered that the visible facade is not blocked by another object when the facade is presented on the display interface at the target location. In this case, all regions of the visible facade are visible regions, and therefore, the area of the visible facade is the area of the visible region of the visible facade.

In a possible implementation, when there is one blocked vertex on the visible facade, a boundary point on an adjacent edge of the blocked vertex is obtained, where the boundary point is used to divide a blocked area and an unblocked area of the visible facade. The area of the visible region of the visible facade is obtained based on the boundary point and an unblocked vertex of the visible facade.

In a possible implementation, when there are two blocked vertices and one blocked edge on the visible facade, a boundary point on an adjacent edge of the blocked edge is obtained. The area of the visible region of the visible facade is obtained based on the boundary point and a blocked vertex of the visible facade.

In a possible implementation, when there are two blocked vertices and no blocked edge on the visible facade, respective boundary points on adjacent edges of the two blocked vertices are obtained. The area of the visible region of the visible facade is obtained based on the boundary points and a blocked vertex of the visible facade.

In a possible implementation, when there are three blocked vertices on the visible facade, a boundary point on an adjacent edge of an unblocked vertex of the visible facade is obtained. The area of the visible region of the visible facade is obtained based on the boundary point and the unblocked vertex of the visible facade.

Figure 4:
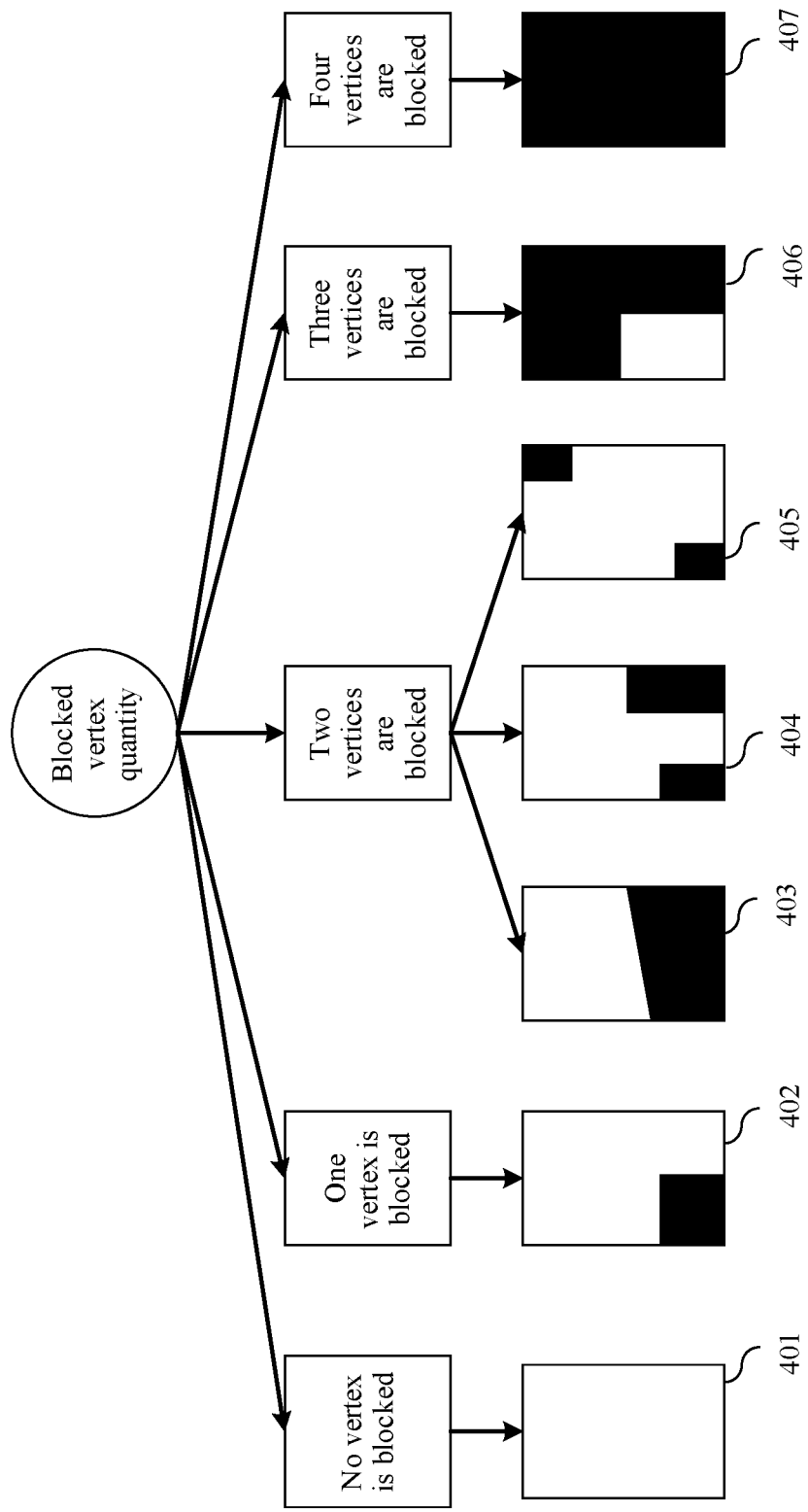
FIG. 4 is a classification diagram of facade vertex blockage statuses according to the embodiment in FIG. 3.

Refer to FIG. 4. FIG. 4 is a classification diagram of facade vertex blockage statuses according to an embodiment of this application. As shown in FIG. 4, there are at least seven states of visible facades with facade vertex blockage.

For a visible facade state 401 in which no vertex is blocked, because no vertex is blocked by another object, it may be approximately considered that a facade corresponding to the facade diagram 401 is not blocked. Therefore, an area of the facade is an area of a visible region of the facade.

Figure 5:
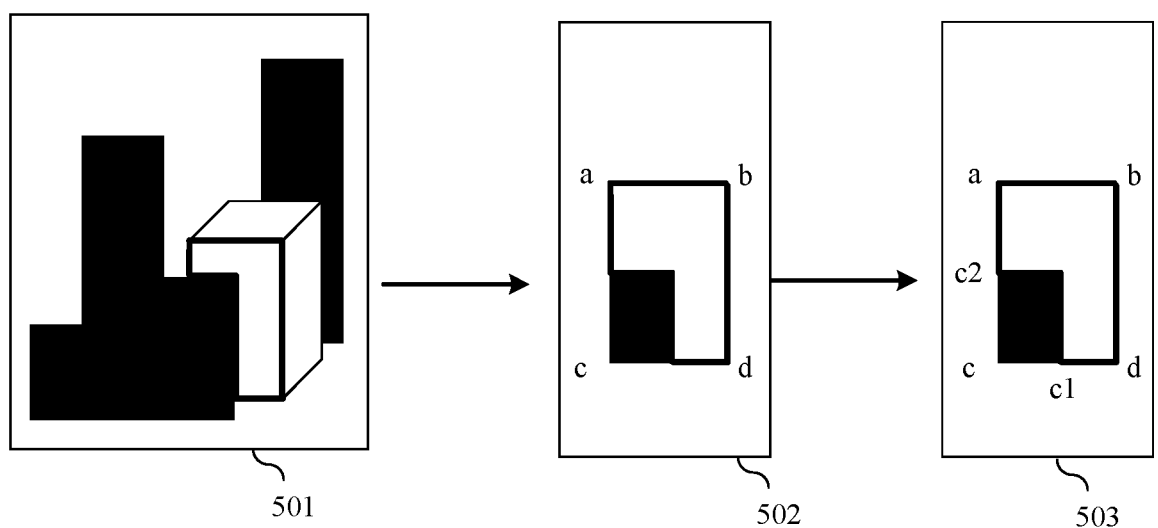
FIG. 5 is a schematic diagram of obtaining a visible region of a facade with one blocked vertex according to the embodiment in FIG. 3.

A visible facade state 402 in which one vertex is blocked is shown in FIG. 5. FIG. 5 is a schematic diagram of obtaining a visible region of a facade corresponding to a case in which one vertex is blocked according to an embodiment of this application. As shown in FIG. 5, the electronic device obtains, based on a facade blockage status 501 of an object, a facade visible region 502 corresponding to a facade of the object. It can be learned from the facade visible region 502 that points a, b, and d are visible after a point c of the facade is blocked. Therefore, based on a blockage status of adjacent edges corresponding to the blocked point c, boundary points c1 and c2 on the adjacent edges may be obtained according to recursive dichotomy. The boundary points c1 and c2 are used as visible endpoints to form a new graph with visible vertices a, b, and d that are not blocked. The graph is used as a visible region corresponding to the facade, and an area corresponding to the graph as an area of the facade visible region.

When a facade has two blocked vertices, and the two blocked vertices share one blocked adjacent edge, a visible facade state 403 is shown. In this case, there are boundary points corresponding to the two blocked vertices on the adjacent edge of the two blocked vertices. Similarly, the method shown in FIG. 5 is used. The boundary points corresponding to the two blocked vertices are obtained according to recursive dichotomy, and are used as visible endpoints. The visible endpoints and two visible unblocked vertices form a new graph. The new graph is used as a visible region corresponding to the facade, and an area corresponding to the graph is used as an area of the visible region of the facade. It should be noted that, in the visible facade state 403, when distances between the two boundary points and the corresponding blocked vertices are the same, the visible region may be a rectangle.

As shown in a visible facade state 404, a facade has two blocked vertices, and the two blocked vertices are non-diagonal vertices, that is, the two blocked vertices share one adjacent edge, and the adjacent edge is not completely blocked. In this case, an adjacent edge corresponding to each blocked vertex has a boundary point corresponding to the blocked vertex. Similarly, boundary points respectively corresponding to the two vertices are obtained as visible endpoints. Two unblocked vertices and four visible endpoints corresponding to the two blocked vertices form a new graph. The graph is used as a visible region corresponding to the facade, and an area corresponding to the graph is used as an area of the visible region of the facade.

As shown in a visible facade state 405, a facade has two blocked vertices, and the two blocked vertices are diagonal vertices. Similar to the visible facade state 404, an adjacent edge corresponding to each blocked vertex has a boundary point corresponding to the blocked vertex. Similarly, boundary points respectively corresponding to the two vertices are obtained as visible endpoints. Two unblocked vertices and four visible endpoints corresponding to the two blocked vertices form a new graph. The graph is used as a visible region corresponding to the facade, and an area corresponding to the graph is used as an area of the visible region of the facade.

As shown in a visible facade state 406, a facade has three blocked vertices. In other words, only one vertex is visible. In this case, boundary points corresponding to the visible vertex on adjacent edges corresponding to the visible vertex are obtained according to dichotomy. The boundary points and the visible vertex form a new graph. The new graph is used as a visible region corresponding to the facade, and an area corresponding to the graph is used as an area of the visible region of the facade.

As shown in a visible facade state 407, a facade has four blocked vertices. In this case, it may be considered that the facade is completely blocked. Therefore, it is considered that the facade has no corresponding visible region, that is, an area of the visible region of the facade is 0.

Step 305: Determine an annotation region from a visible region of the annotation facade, where the annotation region is a region of a first shape with a largest area included in the visible region of the annotation facade.

In a possible implementation, blockage information of the annotation facade is obtained, where the blockage information indicates a blocked vertex and a blocked edge of the annotation facade; and the annotation region is determined in the visible edge of the annotation facade based on the blockage information.

In a possible implementation, the first shape is a rectangle. When the blockage information indicates that one vertex of the annotation facade is blocked, a diagonal vertex of the blocked vertex is used as a first target point. A first endpoint is determined on a non-adjacent edge corresponding to the first target point, so that a rectangle that uses a line segment between the first endpoint and the first target point as a diagonal is a rectangle with a largest area in the visible region of the annotation facade. A region in which the rectangle that uses the line segment between the first endpoint and the first target point as the diagonal is located is determined as the annotation region.

Figure 6:
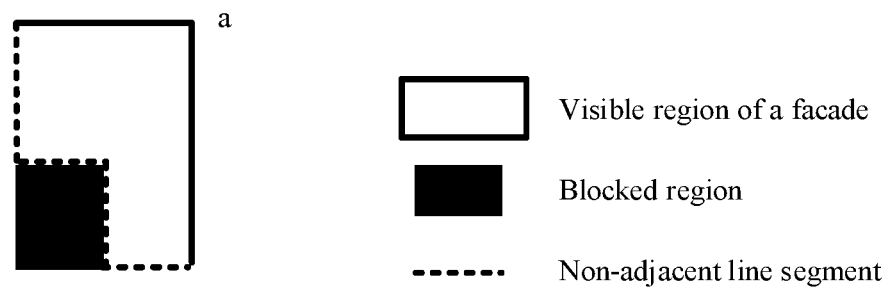
FIG. 6 is a schematic diagram of a method for calculating an annotation range according to the embodiment in FIG. 3.

Refer to FIG. 6. FIG. 6 is a schematic diagram of a method for calculating an annotation range according to an embodiment of this application. As shown in FIG. 6, when there is only one blocked vertex, a diagonal vertex a (a first target point) of the blocked vertex is obtained, and another point (a first endpoint) is determined on a non-adjacent line segment (a non-adjacent edge) of a, to maximize an area of a formed rectangle. The non-adjacent line segment is a line segment that forms a visible region of a facade and that is not directly connected to a.

In a possible implementation, the first shape is a rectangle. When the blockage information indicates that two vertices of the annotation facade are blocked, and that an edge between the two blocked vertices is completely blocked, a vertex with a largest sum of lengths of unblocked parts of adjacent edges is obtained and used as a second target point among unblocked vertices of the annotation facade. A second endpoint is determined on a non-adjacent edge corresponding to the second target point. The second endpoint is located in the visible region of the annotation facade, and a rectangle that uses a line segment between the second endpoint and the second target point as a diagonal is a rectangle with a largest area in the visible region of the annotation facade. A region in which the rectangle that uses the line segment between the second endpoint and the second target point as the diagonal is located is determined as an annotation region.

In a possible implementation, the first shape is a rectangle. A target point set is obtained when the blockage information indicates that there are two blocked vertices on the annotation facade and there is no completely blocked edge. The target point set includes an unblocked vertex of the annotation facade and boundary points on adjacent edges of the two blocked vertexes, where the boundary point is used to divide a blocked region and an unblocked region of the visible facade. A third endpoint is determined in the visible region of the annotation facade, where a rectangle that uses a line segment between the third endpoint and a third target point as a diagonal is a rectangle with a largest area in the visible region of the annotation facade, and the third target point is one target point in the target point set. A region in which the rectangle that uses the line segment between the third endpoint and the third target point as the diagonal is located is determined as an annotation region.

Figure 7:
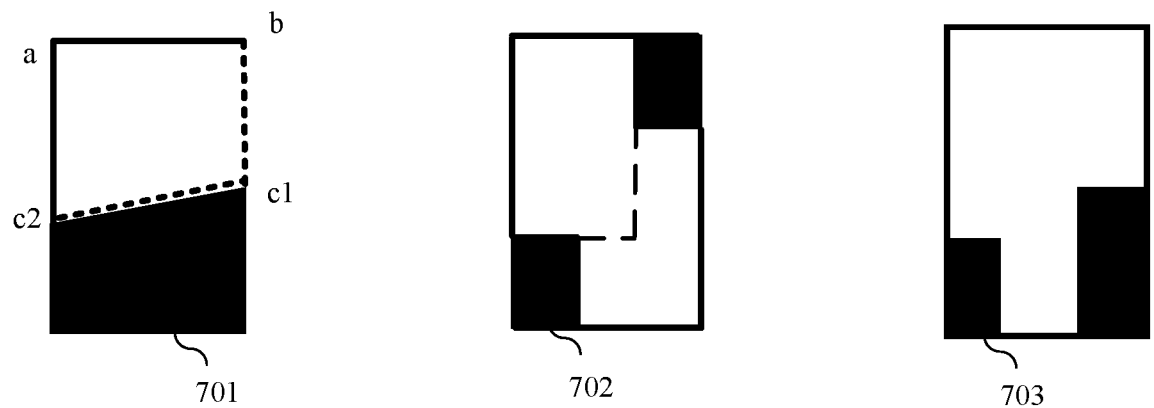
FIG. 7 is a schematic diagram of a method for calculating an annotation range according to the embodiment in FIG. 3.
Figure 7:
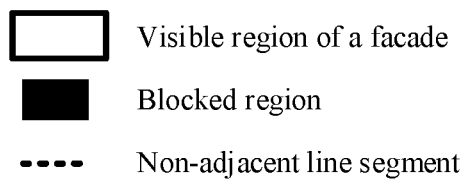

Refer to FIG. 7. FIG. 7 is a schematic diagram of a method for calculating an annotation range according to an embodiment of this application. As shown in FIG. 7, when there are two blocked vertices in a visible facade, there may be three cases. In a first case 701, when a blocked region completely covers an edge, that is, when an edge between the two blocked vertices is completely blocked, the visible region is a quadrilateral. A point a and a point b are two unblocked vertices corresponding to the annotation facade. It can be learned from 701 that a total of lengths of unblocked parts of two adjacent edges corresponding to a is greater than a total of lengths of unblocked parts of two adjacent edges corresponding to b. Therefore, a may be used as a second target vertex (base point), and a second endpoint that is on a non-adjacent line segment and that forms a largest rectangle with a is determined. That is, a point c1 in 701 is determined on the non-adjacent line segment of a. In this case, a rectangle formed by using a and c1 as diagonal vertices is a rectangle with a largest area in the visible region corresponding to 701.

In a second case 702, when a blocked region does not completely cover an edge, and the two unblocked vertices of the visible facade are diagonal vertices, an unblocked region may form an octagon shown in 702. In a third case 703, when a blocked region does not completely cover an edge, and the two blocked vertices of the visible facade share an adjacent edge, an unblocked region of the visible facade may form an octagon shown in 703.

For the annotation facades shown in 702 and 703, a target vertex set of the annotation facade is obtained. To be specific, the unblocked vertices of the annotation facade and boundary points corresponding to adjacent edges of the two blocked vertexes are obtained. A point in the target vertex set is used as a base point. A rectangle that has a largest area in the visible region of the annotation facade and that corresponds to the point is obtained.

In a possible implementation, when the first shape is a rectangle, and the blockage information indicates that three vertices of the annotation facade are blocked, an unblocked vertex of the annotation facade is obtained and used as a fourth target point. A region in which a rectangle formed by the fourth target point and boundary points on two adjacent edges of the fourth target point is located is determined as an annotation region, where the boundary point is used to divide a blocked region and an unblocked region of the visible facade.

Figure 8:
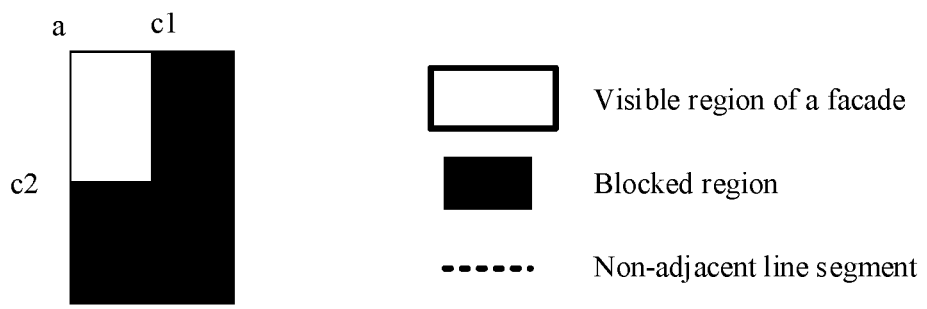
FIG. 8 is a schematic diagram of a method for calculating an annotation range according to the embodiment in FIG. 3.

Refer to FIG. 8. FIG. 8 is a schematic diagram of a method for calculating an annotation range according to an embodiment of this application. As shown in FIG. 8, when three vertices are blocked, an unblocked vertex (that is, a point a) is used as a base point. Boundary points c1 and c2 corresponding to the point a on adjacent edges forms a rectangle with a largest area. A region corresponding to the rectangle is used as an annotation region.

In a possible implementation, the first shape is a rectangle. When the blockage information indicates that three vertices of the annotation facade are blocked, an unblocked vertex of the annotation facade is obtained and used as a fourth target point. A fourth endpoint is determined in the visible region of the annotation facade. A rectangle that uses a line segment between the fourth endpoint and the fourth target point as a diagonal is a rectangle with a largest area in the visible region of the annotation facade. A region in which the rectangle that uses the line segment between the fourth endpoint and the fourth target point as the diagonal is located is determined as the annotation region.

When the three vertices are blocked, the fourth endpoint in the visible region of the annotation region may be directly obtained based on an unblocked vertex in the annotation facade, and a region corresponding to a rectangle that has a largest area and that is formed by the fourth endpoint and the unblocked vertex is obtained and used as the annotation region. When the blocked region is a rectangle, the rectangle formed by the fourth endpoint and the unblocked vertex is the same as the largest rectangle corresponding to FIG. 8.

In a possible implementation, the annotation region is a region of a specified shape in the visible facade.

In the examples in FIG. 6 to FIG. 8, the annotation region is a rectangular region in the visible facade. In embodiments of this application, the annotation region may alternatively be a region of a specified shape such as a circle or a triangle. This is not limited in this application.

Step 306: Present the annotation information of the target object on the annotation facade of the target object presented on the display interface.

In a possible implementation, the annotation information of the target object is presented, based on depth information, on the annotation facade of the target object presented on the display interface.

To be specific, in an AR scene or a VR scene, a model corresponding to the target object is a model constructed based on three-dimensional data. Therefore, the annotation information may have a depth attribute in the annotation region of the annotation facade. In other words, the annotation information presented in the annotation region corresponding to the annotation facade of the model corresponding to the target object may be annotation information having attributes of three dimensions.

In a possible implementation, a three-dimensional model of the annotation information is generated based on a size of the annotation region. The three-dimensional model of the annotation information is presented on a plane parallel to the annotation region presented on the display interface. The parallel plane is a plane in front of the annotation facade and parallel to the annotation facade.

In a possible implementation, a size of the annotation information is generated based on the size of the annotation region. Based on the size of the annotation information, the three-dimensional model of the annotation information presented in the annotation region is displayed in the parallel plane of the annotation facade, and presented on the display interface corresponding to the target location. That is, the size of the annotation information is related to the size of the annotation region. A larger size of the annotation region indicates a larger size of the annotation information, and a larger size of the three-dimensional model that is of the annotation information and that is presented on the display interface.

In a possible implementation, a display direction of the annotation information is determined based on a horizontal length and a vertical height of the annotation region of the annotation facade. Based on the display direction of the annotation information, the annotation information of the target object is presented on the annotation facade of the target object presented on the display interface.

In a possible implementation, when the annotation information is text annotation information, the presentation direction of the annotation information may be determined based on a horizontal length and a vertical height of the annotation region of the annotation facade. For example, when the horizontal length of the annotation region is greater than the vertical height of the annotation region, the annotation information may be presented, in a horizontal direction of the annotation region, on the annotation region presented on the display interface. When the vertical height of the annotation region is greater than the horizontal length of the annotation region, the annotation information may be presented, in a vertical direction of the annotation region, on the annotation region presented on the display interface.

In a possible implementation, information about a distance between the target object and a display interface of a specified scene is obtained; and when the distance information is less than a threshold, the annotation information corresponding to the target object is presented in an annotation region that is corresponding to the annotation facade and that is presented on the display interface.

If the distance between the target object and the display interface of the specified scene is long, a field of view is small when the target object is observed from the target location, and therefore it is difficult to recognize the annotation information. In this case, the annotation information is not presented on the annotation facade corresponding to the target object on the display interface.

In a possible implementation, when an area of the projection region that is for the visible region of the annotation facade and that is on the display interface is greater than a specified area threshold, the annotation information of the target object is presented in the visible region of the annotation facade on the display interface.

When an area of the annotation region of the annotation facade is small, it may also be difficult to recognize an annotation area of the annotation region presented on the display interface. In this case, the annotation information is not presented on the annotation facade corresponding to the target object on the display interface.

Figure 9:
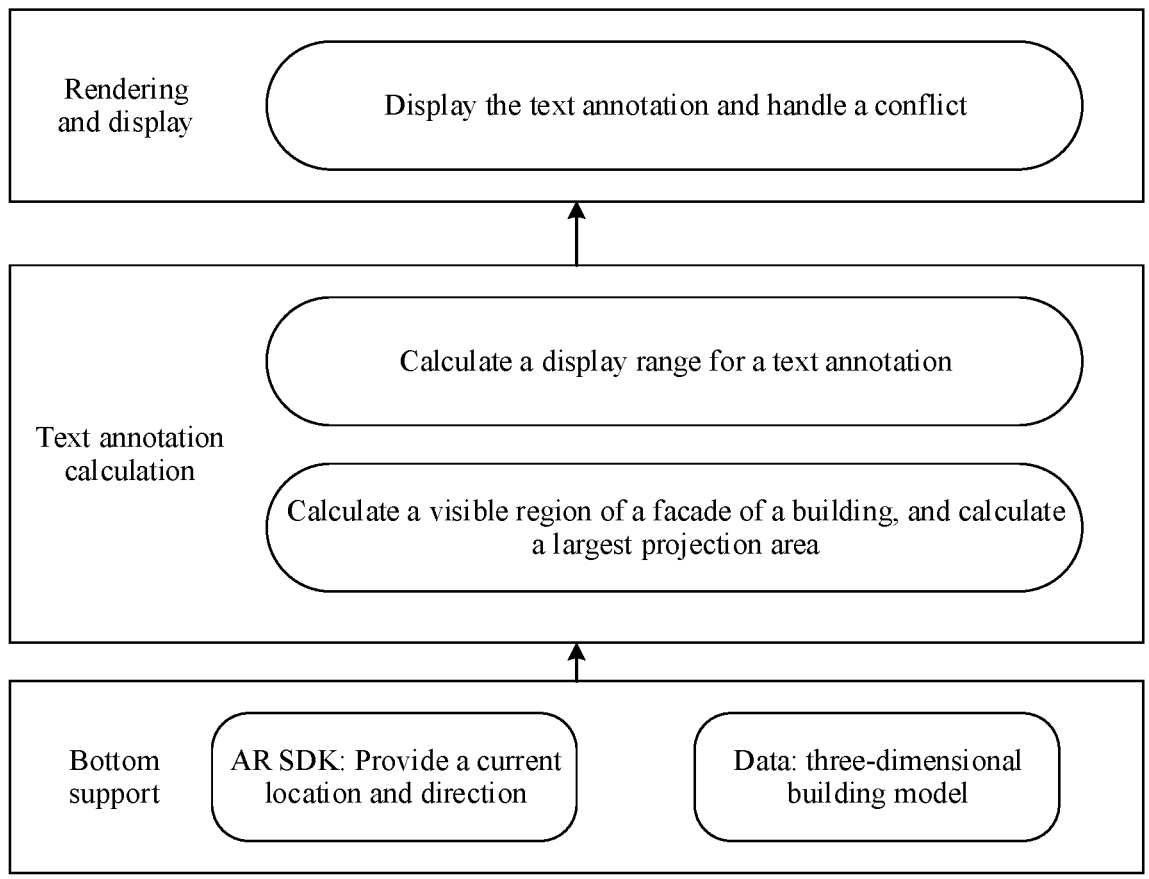
FIG. 9 is a flowchart of a data resource according to the embodiment in FIG. 3.

Refer to FIG. 9. FIG. 9 is a flowchart of a data resource processing according to an embodiment of this application. As shown in FIG. 9, the solutions shown in embodiments of this application may be implemented by a terminal on which AR Software Development Kit (SDK) platform software and a three-dimensional building data model are deployed. In a running process, program code runs in a host memory and/or a Graphics Processing Unit (GPU) memory of a terminal device, and a model of a building around a current location is loaded by using a server. Based on bottom support provided by the terminal, the terminal may perform text annotation calculation and rendering display, including calculating a visible region of a building, calculating an area for projecting the visible region, calculating a text annotation display range, displaying the text annotation, and handling a conflict.

Figure 10:
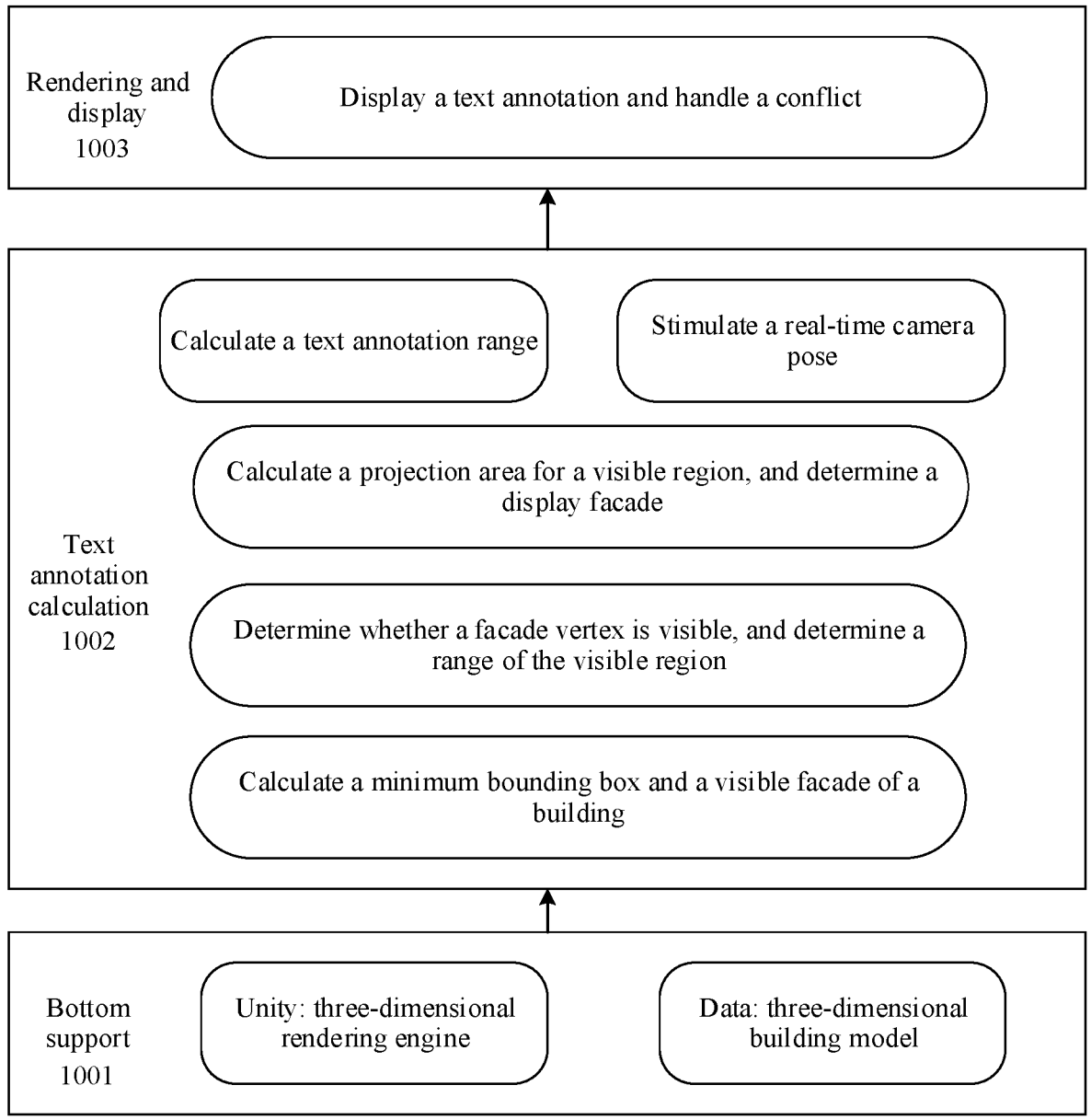
FIG. 10 is a diagram of a structure of an annotation presentation method according to the embodiment in FIG. 3.

Refer to FIG. 10. FIG. 10 is a diagram of a structure of an annotation presentation method according to an embodiment of this application. As shown in FIG. 10, text annotation display is used as an example. The structure of the method includes bottom support 1001, annotation text calculation 1002, and rendering display 1003, and the method is executed by an electronic device. The method shown in this application may be developed on the three-dimensional rendering engine "Unity". Unity provides an encapsulated 3D rendering pipeline, provides functions such as collision detection and three-dimensional rendering, and loads a three-dimensional model of a city building based on data corresponding to a three-dimensional building, to provide the bottom support in this method.

The electronic device determines visible facades of a building based on a minimum bounding box, and then determines, based on the minimum bounding box of the building, visible vertices corresponding to the visible facades of the building and visible regions of the facades. Based on areas of projections of the visible regions in a direction corresponding to the user, a facade corresponding to a largest projection area is used as a display facade.

Based on the determined display facade, a largest range for text annotation display on the display facade is calculated. A text annotation is displayed in the largest text annotation display range corresponding to the three-dimensional building model of the building annotated by using a text. In addition, after the content of the text annotation is rendered and displayed on the facade, the content may be blocked when projected to a screen. For example, a closer text annotation blocks another text annotation behind the text annotation. In this case, a conflict occurs. Therefore, a text annotation display conflict needs to be processed.

In addition, in a process of performing the foregoing method, the camera performs real-time pose simulation. The electronic device simulates a real-time location and an angle of the user, to verify whether text annotation display is correct.

Figure 11:
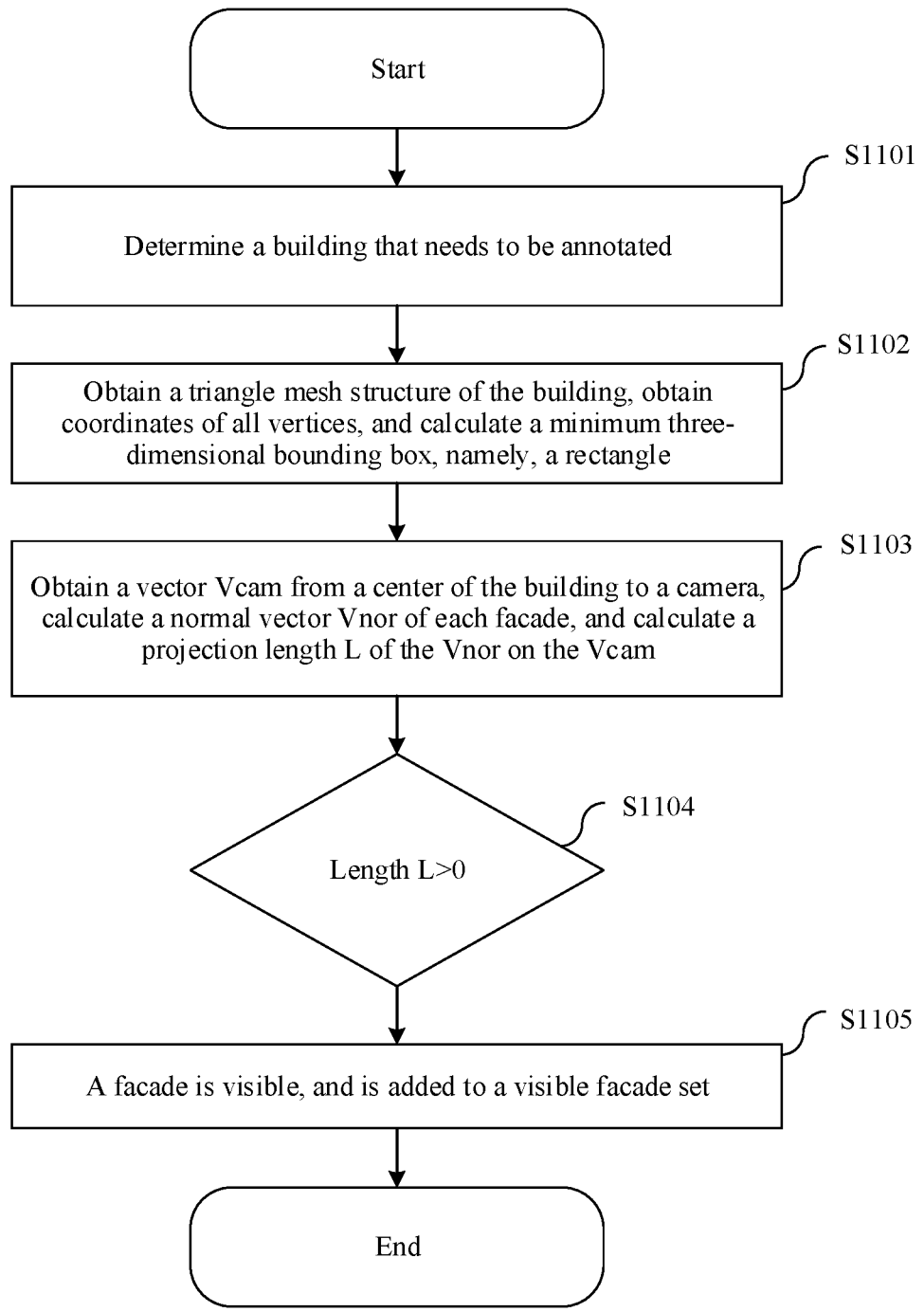
FIG. 11 is a flowchart of calculating a visible facade of a building according to the embodiment in FIG. 3.

Refer to FIG. 11. FIG. 11 is a flowchart of calculating a visible facade of a building according to an embodiment of this application. As shown in FIG. 11, the following steps are included.

S1101: An electronic device determines a building that needs to be annotated.

S1102: Obtain, based on a three-dimensional model corresponding to the annotated building, a triangle mesh structure corresponding to the constructed three-dimensional model of the building; obtain vertex coordinates corresponding to the building; calculate, based on the vertex coordinates corresponding to the building, a minimum bounding box structure (that is, a cuboid structure) corresponding to the building; and use the minimum bounding box as a target model corresponding to the building.

S1103: Obtain a vector Vcam from a center of the building to a camera, calculate a normal vector Vnor of each facade of the target model, and calculate a projection length value L of the Vnor on the Vcam.

S1104: When L is greater than 0, it indicates that a projection vector of the Vnor on the Vcam is in a same direction as that of the Vcam, and in this case, a facade corresponding to the Vnor is a facade visible in the direction of the Vcam; or when L is less than 0, it indicates that the direction of the projection vector of the Vnor on the Vcam is opposite to that of the Vcam vector, and in this case, the Vnor is a facade invisible in the direction of the Vcam.

S1105. Add the visible facade to a visible facade set.

Figure 12:
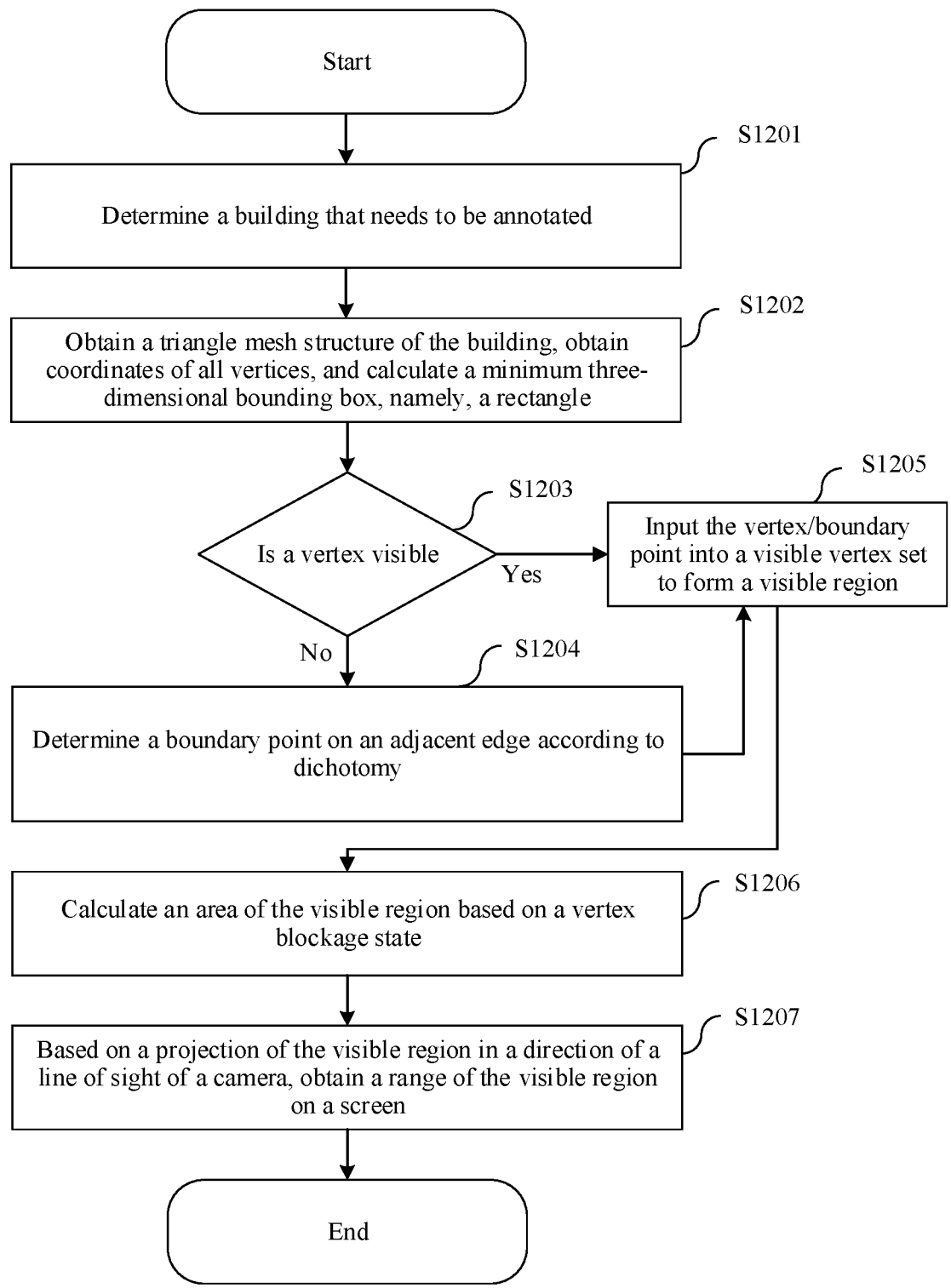
FIG. 12 is a flowchart of a method for calculating a visible region according to the embodiment in FIG. 3.

Refer to FIG. 12. FIG. 12 is a flowchart of a method for calculating a visible region according to an embodiment of this application.

S1201: An electronic device determines a building that needs to be annotated.

S1202: Obtain, based on a three-dimensional model corresponding to the annotated building, a triangle mesh structure corresponding to the constructed three-dimensional model of the building; obtain vertex coordinates corresponding to the building; calculate, based on the vertex coordinates corresponding to the building, a minimum bounding box structure (that is, a cuboid structure) corresponding to the building; and use the minimum bounding box as a target model corresponding to the building.

S1203: Traverse visible facades in a set, and determine, based on a location relationship between a camera and a facade vertex corresponding to the building, whether a connection line between the camera and the facade vertex of the visible facade of the building is blocked by another building; and determine whether the facade vertex is in a field of view of the camera.

S1204: When the vertex is a visible vertex, directly input the vertex into a visible vertex set; or determine, according to dichotomy, a boundary point dividing a blocked region and an unblocked region on an adjacent edge of the vertex when the vertex is an invisible vertex.

S1205: Input the boundary point as a visible vertex into the visible vertex set.

S1206: After all visible vertices corresponding to the building are identified, form, based on the visible vertices, a visible region corresponding to the building model, and calculate an area of the visible region based on a blockage status.

S1207: Based on a projection of the visible region on a line of sight of the camera, obtain a range of the visible region on a screen, that is, a range that can be observed by a user on the screen.

Figure 13:
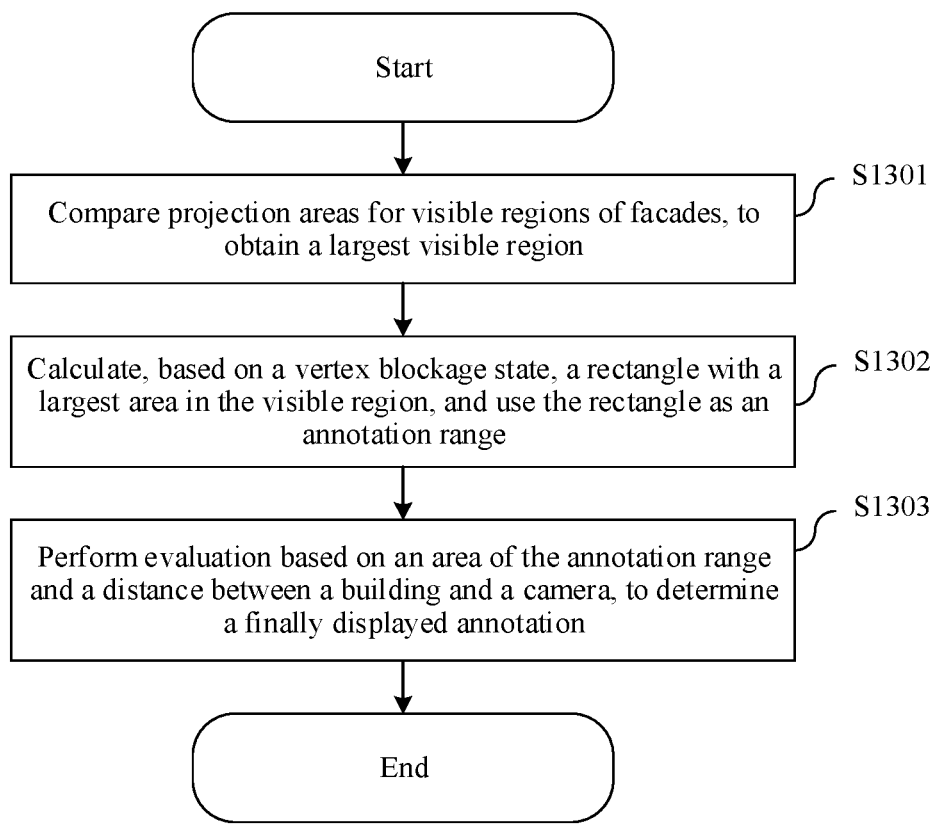
FIG. 13 is a flowchart of calculating a text annotation range according to the embodiment in FIG. 3.

Refer to FIG. 13. FIG. 13 is a flowchart of calculating a text annotation range according to an embodiment of this application.

S1301: Compare areas of visible regions, and use a facade with a visible region having a largest area as an annotation facade.

S1302: Calculate, based on a vertex blockage status, a rectangle with a largest area in the visible region, and use a region corresponding to the rectangle as an annotation range, that is, annotation information corresponding to a building may be displayed in the annotation range.

S1303: Before the annotation information corresponding to the building is displayed in the annotation range, whether to display the annotation information needs to be determined, to be specific, whether to display the annotation information needs to be determined based on an area of the annotation range and a distance between the building and a camera. For example, when the area of the annotation range is small, the annotation information displayed based on the annotation range is small. In this case, it may be difficult for a user to clearly see the displayed annotation information. Therefore, the annotation range may not be displayed. When the building is far away from the camera, a display area of the building on a terminal may also be small. In this case, the user may not clearly see the displayed annotation information. Therefore, the annotation range may not be displayed.

Figure 14:
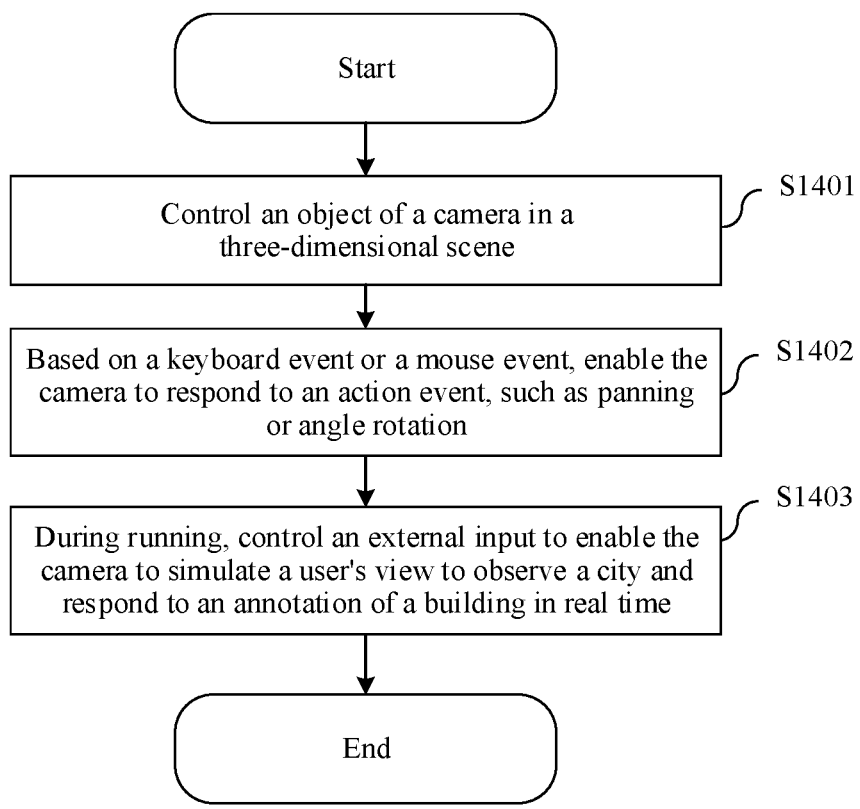
FIG. 14 is a flowchart of real-time camera pose stimulation according to the embodiment in FIG. 3.

Refer to FIG. 14. FIG. 14 is a flowchart of real-time camera pose stimulation according to an embodiment of this application. As shown in FIG. 14, in the foregoing annotation display process, steps shown in FIG. 14 may be performed in real time to verify the building information annotation method provided in embodiments of this application. According to the steps, corresponding instructions are input into a terminal to control response events of a camera, such as moving and angle rotation, so as to simulate scene browsing of a user. An example in which the terminal is a personal computer is used.

S1401: A user may input a corresponding instruction through an external device such as a keyboard or a mouse, to control an object corresponding to a camera in a simulated three-dimensional scene.

S1402: The electronic device enables, based on the user input from a keyboard, a mouse, or the like in real time, the camera to respond to action events such as panning and angle rotation.

S1403: During running, the electronic device implements external input control, to enable the camera to simulate a user's view to observe a city and respond to annotation information of a building in real time; and determines, based on a display state of the annotation information of a building, whether the information annotation method corresponding to embodiments of this application can be normally implemented.

In this application, in addition to a text annotation of a building, information annotation may be performed in a plurality of forms, for example, a picture annotation and a video annotation. There are various application scenarios. For example, in an AR scene, a video advertisement may be played on a building facade, a new vehicle model is exhibited on a building facade, store information is presented on a store building, and history of a cultural relic is introduced on a museum building. After a visible facade of a building is identified in the AR scene, multimedia information can be displayed in the scene. In addition, the user can receive AR scene information when observing from different angles, thereby improving AR experience.

An embodiment of this application further proposes to calculate a visible region of a building model in a three-dimensional scene, and calculate a projection area of the visible region projected in a direction of a user's line of sight, to determine a direction of a facade displaying a building annotation.

First, a visible region of a building model in a three-dimensional scene is calculated. Classification calculation is performed to obtain a vertex blockage status of a building facade. An area of the visible region is calculated. The area of the visible region is projected in a direction of user's line of sight, to obtain a range of the visible region of the facade on the screen. The visible region of the building facade is calculated, and a text annotation is displayed in the visible region. In this case, a location of the text annotation is in the visible region of the building, and a direction of the text annotation is a direction of the facade of the building. The text annotation is three-dimensional and not blocked by a building that is in the current frame. The three-dimensional text annotation changes on the screen as a distance changes. A text closer to the user has a larger size when displayed on the screen. In addition, when a direction of the text is the same as a direction of a building, association between the text annotation and the annotated building is stronger.

In addition, the display range for the text annotation in the visible region is calculated, and the annotation text is adaptively displayed at different angles. In the solution shown in this embodiment of this application, calculation is performed dynamically to obtain the range of the visible region, so as to calculate a rectangle with a largest area. The visible region is a two-dimensional plane, and a shape of the visible region changes as the user's angle changes. Based on vertex visibility and a relationship between vertices of the facade, a base point of the rectangle needs to be determined, and locations of symmetric points of the rectangle need to be determined to determine the rectangle with the largest area. When the user uses an AR application for browsing, building content in a scene changes, and a building text annotation changes as the scene changes. In this way, the annotation is presented to the user in a better perspective.

Figure 15:
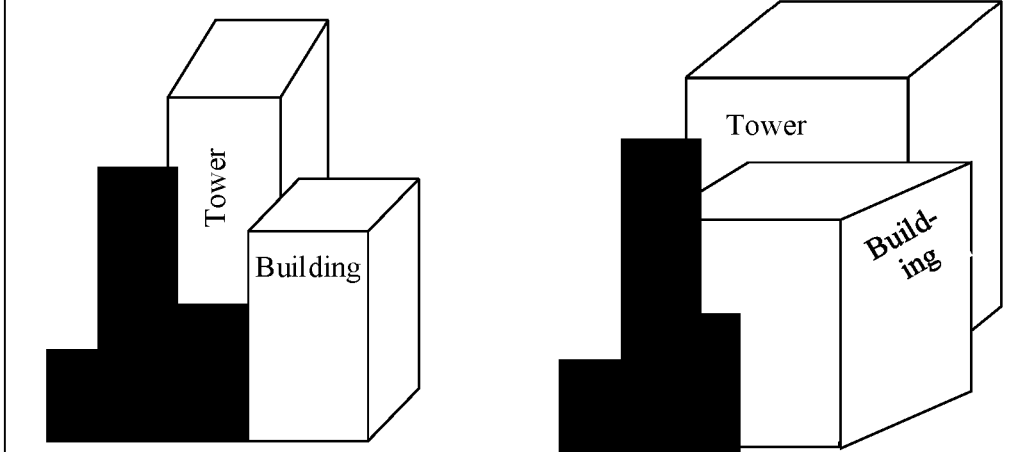
FIG. 15 is a schematic diagram of comparison between the embodiment shown in FIG. 3 and an AR map technology.
Figure 15:
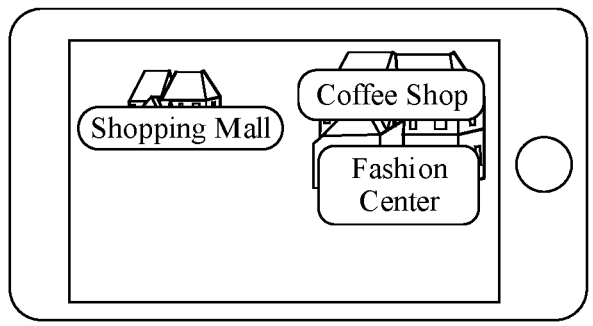
Figure 15:
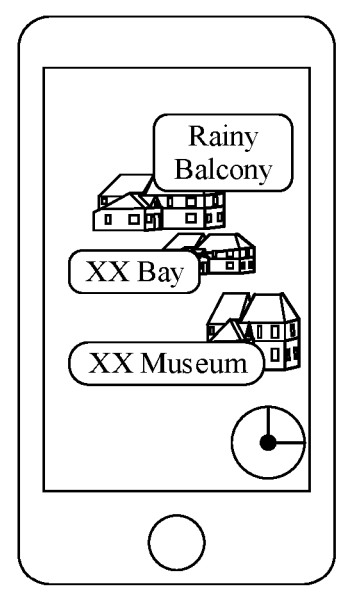

FIG. 15 is a schematic diagram of comparison between an embodiment of this application and an AR map technology. As shown in FIG. 15, according to a solution 1501 shown in this embodiment of this application, a building annotation changes when observed from a different view. The building annotation is in a visible range of a scene, and is in a direction of a building facade. It is easy for a user to associate an annotation with an annotated building. In addition, a distance from the user can change, and the annotation can provide location and direction guidance for the user, thereby improving AR user experience. In an AR map technology shown in 1502, annotations are not strongly associated with annotated buildings.

An annotation in the AR scene has the following characteristics. 1. When a user is browsing, there should not be a large amount of building annotation information. Pieces of information are ranked based on distances from the user and sizes of visible regions. A shorter distance from the user and a larger visible region indicate a higher priority. 2: When a vertical axis of a visible region is longer than a horizontal axis, the building information can be displayed vertically. 3: If a text annotation range is so small that the building information cannot be effectively displayed, building information may not be displayed.

An information annotation method used in the AR map technology 1502 in the AR scene is to flatten a text annotation on a screen range of a building by identifying a range of the building on a screen. The information annotation is still a two-dimensional annotation, and depth information in the AR scene is not used. In addition, the flat information annotation is not strongly associated with a building to which the information belongs. In this case, other content in the scene may be blocked.

A difference between the AR map technologies 1501 and 1502 in this embodiment of this application lies in that three-dimensional information annotation is implemented. An information annotation is displayed in a visible region of a building, and a direction of a normal line of the information annotation is the same as that of a normal line of a facade. In this way, association between the information annotation and a building to which the information annotation belongs is stronger. The information annotation becomes a part of the AR scene, and less other content in the scene is blocked. Therefore, AR user experience is better.

According to the AR map technology 1501, an annotation of a building in a three-dimensional scene is static, and a blind region exists when a user browses the annotation from different angles, or a direction of the annotation information is incorrect. Text content is displayed in a visible region after calculating a building region that is visible from a user angle in a current frame. In the solution shown in this embodiment of this application, when a user browses a building from different angles, annotation information of the building is automatically adjusted, and the information changes as the angle changes. In this manner, annotation information can be dynamically displayed. Information annotation is more flexible and intelligent in a three-dimensional scene. A building annotation may also be presented through multimedia, for example, through an image or a video. Annotation information is an important interaction entry in an AR application.

According to the AR map technology 1502, an annotation of a building in a three-dimensional scene is flat on a screen, and is not strongly associated with the building. The annotation may block other content in the scene. However, in the solution shown in this embodiment of this application, a three-dimensional annotation in a three-dimensional scene is calculated; an annotation direction is the same as a direction of a facade of a building; and a distance change of the annotation information can be presented on a screen. Therefore, a location and a direction of the annotation can be indicated in a specific direction through three-dimensional building annotation. In this way, the association between the annotation and the annotated building is stronger. In addition, the text is expressed in a form of a line. In this case, orientation information of the building can be indicated, and user's three-dimensional experience in the AR scene is further improved.

In conclusion, in the solution shown in this embodiment of this application, a visible facade in exterior facades of a target object is obtained in a virtual reality scene or an augmented reality scene; an annotation facade is determined from visible facades of the target object based on projections of the visible facades on a display interface; and annotation information of the target object is presented in a region corresponding to a visible region of the annotation facade. According to the foregoing solution, when an annotation of a target object is displayed, an annotation facade may be selected based on a target location and a projection of a visible facade on a display interface of a specified scene. Therefore, in a virtual reality/augmented reality scene, a facade with a larger visible region is flexibly selected to display the annotation information, thereby improving display effect of the annotation information.

Figure 16:
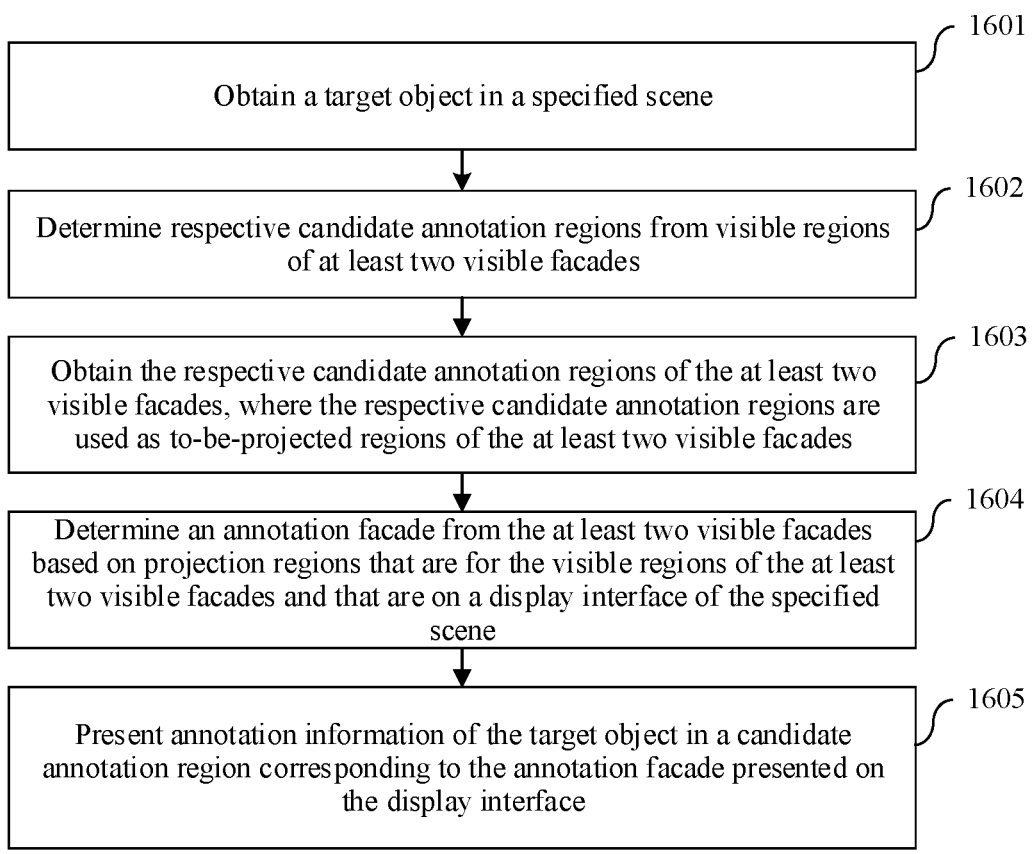
FIG. 16 is a flowchart of a method for presenting object annotation information according to an example embodiment.

Refer to FIG. 16. FIG. 16 is a flowchart of a method for presenting object annotation information according to an example embodiment. The method may be executed by an electronic device. The electronic device may be a terminal or a server. Alternatively, the electronic device may include a terminal and a server. The terminal may be the user terminal 140 in the embodiment shown in FIG. 1. The server may be the server 120 in the embodiment shown in FIG. 1. A VR map or AR map application scenario in which a building is a target object is used as an example. As shown in FIG. 16, a procedure of the method for presenting object annotation information may include the following steps.

Step 1601: Obtain a target object in a specified scene.

In a possible implementation, when the specified scene is a VR scene, the target object may be an object constructed by a VR device based on three-dimensional model data; or when the specified scene is an AR scene, the target object may be an object photographed by an AR device with a camera component.

Step 1602: Determine respective candidate annotation regions from the visible regions of the at least two visible facades.

The candidate annotation region is a region of a second shape with a largest area in the visible region of the corresponding facade.

A manner of determining the candidate annotation region is similar to the method for determining the annotation region on the annotation facade in step 305 corresponding to FIG. 3. Details are not described herein again.

Step 1603: Obtain the respective candidate annotation regions of the at least two visible facades, where the respective candidate annotation regions are used as the to-be-projected regions of the at least two visible facades.

The candidate annotation region is a region of a second shape with a largest area in the visible region of the corresponding facade. In other words, in this embodiment of this application, a part of the visible region of the visible facade may be used as the to-be-projected region. That is, the candidate annotation region is used as the to-be-projected region.

In a possible implementation, the to-be-projected regions of the at least two visible facades are projected to the display interface of the specified scene, and the projection regions that are for the visible regions of the at least two visible facades and that are presented on the display interface of the specified scene are obtained.

In a possible implementation, the candidate annotation regions are used as the to-be-projected regions and are projected to the display interface of the specified scene; and projection regions that are for the candidate annotation regions of the at least two visible facades and that are presented on the display interface of the specified scene are obtained.

Step 1604: Determine the annotation facade from the at least two visible facades based on the projection regions that are for the visible regions of the at least two visible facades and that are presented on the display interface of the specified scene.

In a possible implementation, the annotation facade is determined from the at least two visible facades based on the projection regions that are for the candidate annotation regions of the at least two visible facades and that are presented on the display interface of the specified scene.

In a possible implementation, the annotation facade is determined from the at least two visible facades based on projection areas corresponding to the projection regions that are for the candidate annotation regions of the at least two visible facades and that are presented on the display interface of the specified scene.

Before the annotation facade of the target object is determined, a candidate annotation region of a specified shape of each visible facade may be obtained. The candidate annotation region of each visible facade is used as the to-be-projected region, and is projected to a display interface of a specified scene. Then, the annotation facade is determined based on projection areas of to-be-projected regions on the display interface of the specified scene. Because included angles between the target location and different visible facades are different, a large projection area of a visible region of a visible facade may correspond to a small projection area of an annotation region corresponding to the visible facade. Therefore, projection areas of annotation facades corresponding to the visible facades may be compared first, and then the annotation facade is determined based on a comparison result.

Step 1605: Present annotation information of the target object in a candidate annotation region corresponding to the annotation facade presented on the display interface.

After the annotation facade is determined based on the candidate annotation regions corresponding to the at least two facades, the annotation information corresponding to the target object may be presented in a presentation region that is on the display interface and that is for the candidate annotation region corresponding to the annotation facade. To be specific, projection areas of largest regions that are of a specified shape and that correspond to all the visible facades are first compared, and the annotation information is presented on a candidate annotation region of a visible facade that corresponds to a projection region with a largest area.

In conclusion, in the solution shown in this embodiment of this application, a visible facade in exterior facades of a target object is obtained in a specified scene; an annotation facade is determined from visible facades of the target object based on projections of the visible facades on a display interface; and annotation information of the target object is presented in a region corresponding to a visible region of the annotation facade. According to the foregoing solution, when an annotation of a target object is displayed, an annotation facade may be selected based on a projection of a visible facade on a display interface of a specified scene. In this way, display effect of the annotation information can be improved.

Figure 17:
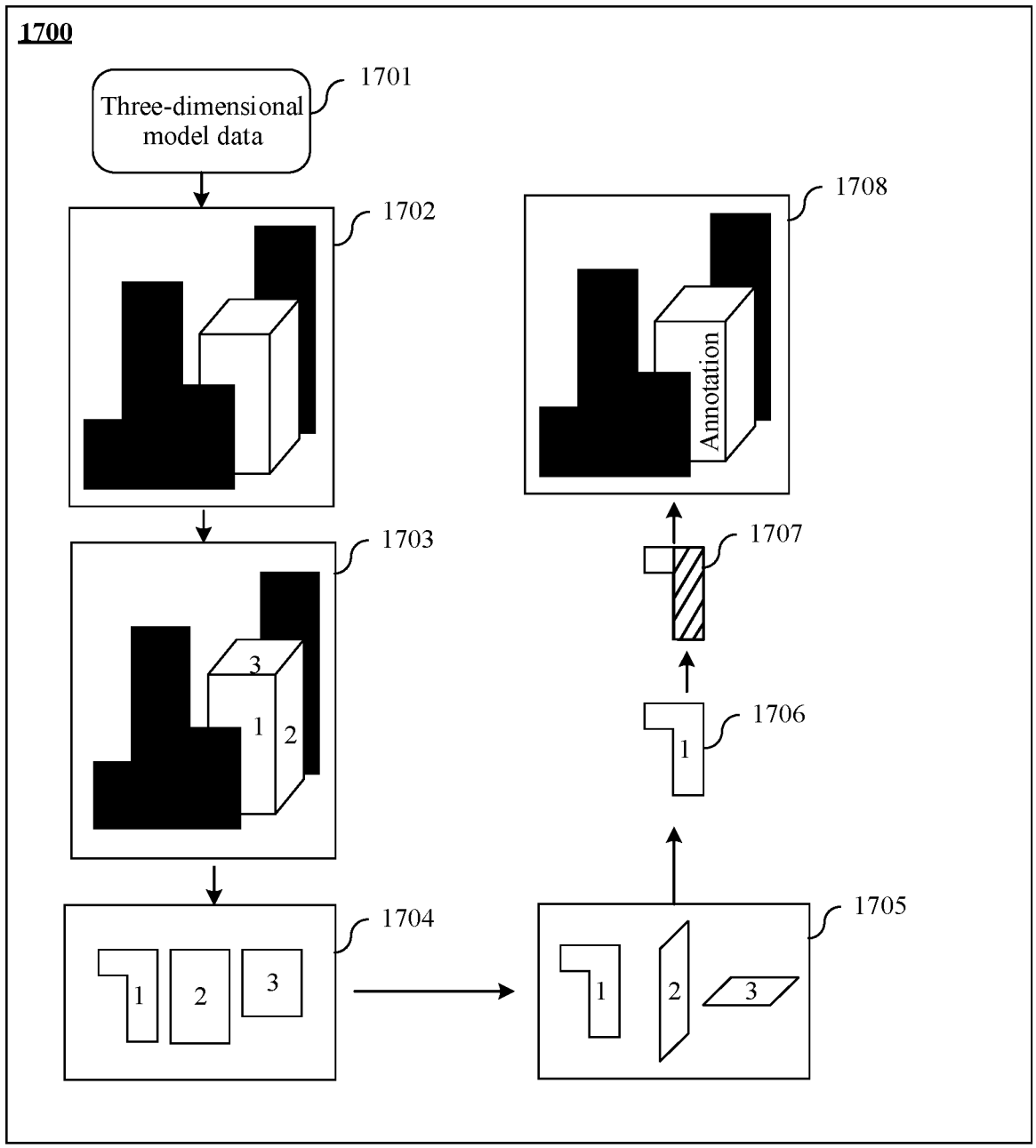
FIG. 17 is a schematic flowchart of a method for presenting object annotation information.

Refer to FIG. 17. FIG. 17 is a schematic flowchart of a method for presenting object annotation information. As shown in FIG. 17, for example, the method is applied to a user terminal 1700, and an application scenario is an AR map. Based on three-dimensional model data 1701 and information about a current location and orientation of the user terminal, the user terminal 1700 constructs several three-dimensional building models 1702 in a direction corresponding to the user terminal. When a target building model is identified, visible facades 1703 corresponding to the model in a direction of the user terminal are obtained. A visible region 1704 corresponding to each visible facade is obtained based on the visible facade corresponding to the target building in the direction of the user terminal. An area corresponding to each visible region 1704 is obtained.

Based on projections 1705 of the visible regions in the direction of the user terminal, among the visible regions, a visible facade corresponding to a visible region with a largest projection area in the direction of the user terminal is obtained and used as an annotation facade 1706. Based on the annotation facade, a region of a specified shape with a largest area in the annotation facade is used as an annotation region 1707 corresponding to the annotation facade. Annotation information 1708 of a building is displayed in the annotation region 1707 on the three-dimensional building model corresponding to the building, and is presented on the display interface.

Figure 18:
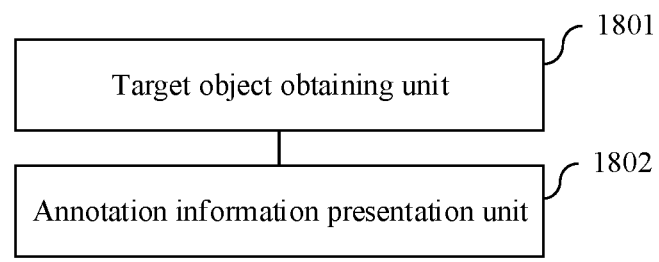
FIG. 18 is a block diagram of a structure of an apparatus for presenting object annotation information according to an example embodiment.

FIG. 18 is a block diagram of a structure of an apparatus for presenting object annotation information according to an example embodiment. The apparatus for presenting object annotation information can implement all or some of the steps in the method provided in the embodiment shown in FIG. 2, FIG. 3, or FIG. 16. The apparatus for presenting object annotation information may include:

a target object obtaining unit 1801, configured to obtain a target object in a specified scene, where the specified scene is a scene presented at a target location; and an annotation information presentation unit 1802, configured to present annotation information of the target object on an annotation facade that is of the target object and that is presented on a display interface, where the annotation facade is determined from at least two visible facades of the target object based on projection regions that are for the at least two visible facades and that are displayed on the display interface, and the visible facade is a facade visible to the target location in exterior facades of the target object.

In a possible implementation, the specified scene is an augmented reality scene or a virtual reality scene presented at the target location.

In a possible implementation, the annotation facade is one facade that is in the at least two visible facades and whose projection region presented on the display interface has a largest area.

In a possible implementation, the apparatus further includes:

a to-be-projected region obtaining unit, configured to obtain to-be-projected regions of the at least two visible facades based on visible regions of the at least two visible facades, where the visible region is a region that is of a corresponding visible facade and that is visible to the target location in the specified scene; and a projection region obtaining unit, configured to project the to-be-projected regions of the at least two visible facades to the display interface, and obtain projection regions that are for the visible regions of the at least two visible facades and that are displayed on the display interface.

In a possible implementation, the to-be-projected region obtaining unit is configured to:

obtain all the visible regions of the at least two visible facades, where all the visible regions are used as the to-be-projected regions of the at least two visible facades.

In a possible implementation, the annotation information presentation unit 1802 includes:

a region determining subunit, configured to determine an annotation region in the visible region of the annotation facade, where the annotation region is a region of a first shape with a largest area included in the visible region of the annotation facade; and an annotation information presentation subunit, configured to present the annotation information of the target object in the annotation facade of the target object presented on the display interface.

In a possible implementation, the region determining subunit includes:

a blockage information obtaining subunit, configured to obtain blockage information of the annotation facade, where the blockage information indicates a blocked vertex and a blocked edge of the annotation facade; and an annotation region determining subunit, configured to determine the annotation region in the visible region of the annotation facade based on the blockage information.

In a possible implementation, the first shape is a rectangle, the annotation region determining subunit is configured to:

when the blockage information indicates that a vertex of the annotation facade is blocked, use a diagonal vertex of the blocked vertex as a first target point;

determine a first endpoint on a non-adjacent edge corresponding to the first target point, so that a rectangle that uses a line segment between the first endpoint and the first target point as a diagonal is a rectangle with a largest area in the visible region of the annotation facade; and determine, as the annotation region, a region in which the rectangle that uses the line segment between the first endpoint and the first target point as the diagonal is located.

In a possible implementation, the first shape is a rectangle, the annotation region determining subunit is configured to:

when the blockage information indicates that two vertices of the annotation facade are blocked, and an edge between the two blocked vertices is completely blocked, obtain, in unblocked vertices of the annotation facade, a vertex with a largest total of lengths of unblocked parts of adjacent edges, where the obtained vertex is used as a second target point;

determine a second endpoint on a non-adjacent edge corresponding to the second target point, where the second endpoint is in the visible region of the annotation facade, and a rectangle that uses a line segment between the second endpoint and the second target point as a diagonal is a rectangle with a largest area in the visible region of the annotation facade; and determine, as the annotation region, a region in which the rectangle that uses the line segment between the second endpoint and the second target point as the diagonal is located.

In a possible implementation, the first shape is a rectangle, the annotation region determining subunit is configured to:

obtain a target point set when the blockage information indicates that two vertices of the annotation facade are blocked and there is no completely blocked edge, where the target point set includes an unblocked vertex of the annotation facade and boundary points on adjacent edges of the two blocked vertices, and the boundary point is used to divide a blocked region and an unblocked region of the visible facade;

determine a third endpoint in the visible region of the annotation facade, where a rectangle using a line segment between the third endpoint and a third target point as a diagonal is a rectangle with a largest area in the visible region of the annotation facade, and the third target point is one target point in the target point set; and determine, as the annotation region, a region in which the rectangle that uses the line segment between the third endpoint and the third target point as the diagonal is located.

In a possible implementation, the first shape is a rectangle, the annotation region determining subunit is configured to:

when the blockage information indicates that three vertices of the annotation facade are blocked, obtain an unblocked vertex of the annotation facade, where the unblocked vertex is used as a fourth target point; and determine, as the annotation region, a region in which a rectangle formed by the fourth target point and boundary points on two adjacent edges of the fourth target point is located, where the boundary point is used to divide a blocked region and an unblocked region of the visible facade.

In a possible implementation, the annotation information presentation subunit includes:

an annotation information model generation subunit, configured to generate a three-dimensional model of the annotation information based on a size of the annotation region; and an annotation information model presentation subunit, configured to present the three-dimensional model of the annotation information on a parallel plane of the annotation region that is presented on the display interface, where the parallel plane is a plane in front of the annotation facade and parallel to the annotation facade.

In a possible implementation, the to-be-projected region obtaining unit includes:

a candidate annotation region determining subunit, configured to determine respective candidate annotation regions from the visible regions of the at least two visible facades, where the candidate annotation region is a region of a second shape with a largest area included in a visible region of a corresponding facade; and a to-be-projected region obtaining subunit, configured to obtain the respective candidate annotation regions of the at least two visible facades, where the respective candidate annotation regions are used as the to-be-projected regions of the at least two visible facades.

In a possible implementation, the annotation information presentation unit 1802 is further configured to:

present the annotation information of the target object in a candidate annotation region corresponding to the annotation facade presented on the display interface.

In a possible implementation, the annotation information presentation unit 1802 is configured to:

when an area of a projection region that is on the display interface and that is for the visible region of the annotation facade is greater than a specified area threshold, present the annotation information of the target object on the annotation facade presented on the display interface.

In conclusion, in the solutions shown in embodiments of this application, a visible facade in exterior facades of a target object is obtained in a virtual reality scene or an augmented reality scene; an annotation facade is determined from visible facades of the target object based on projections of the visible facades on a display interface; and annotation information of the target object is presented in a region corresponding to a visible region of the annotation facade. According to the foregoing solutions, when an annotation of a target object is displayed, an annotation facade may be selected based on a target location and a projection of a visible facade on a display interface of a specified scene. Therefore, in the specified scene, a facade with a larger visible region is flexibly selected to display the annotation information, thereby improving display effect of the annotation information.

It can be understood that, to implement the foregoing functions, the electronic device includes corresponding hardware structures and/or software modules (or units) for performing the functions. Units and algorithm steps in examples described with reference to embodiments disclosed in this application may be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions in embodiments of this application.

In embodiments of this application, functional unit division may be performed on the electronic device based on the foregoing method examples. For example, division of functional units may be based on corresponding functions, or two or more functions may be integrated into one processing unit. The integrated unit may be implemented in a form of hardware, or may be implemented in a form of a software functional unit. It should be noted that, unit division in embodiments of this application is an example, and is merely logical function division. In actual implementation, another division manner may be used.

Figure 19:
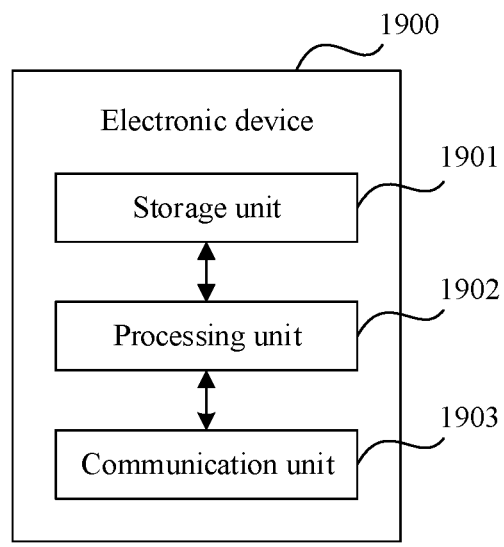
FIG. 19 is a schematic block diagram of an electronic device according to an example embodiment.

When an integrated unit is used, FIG. 19 is a schematic diagram of a possible structure of an electronic device in the foregoing embodiments. The electron device 1900 includes a processing unit 1902 and a communication unit 1903. The processing unit 1902 is configured to control and manage an action of the electronic device 1900. For example, when the electronic device 1900 is a user terminal, the processing unit 1902 is configured to support the electronic device 1900 in performing step 21 and step 22 in the embodiment shown in FIG. 2, step 301 to step 306 in the embodiment shown in FIG. 3, step 1601 to step 1605 in the embodiment shown in FIG. 16, and/or other steps of the technologies described in this specification. The electronic device 1900 may further include a storage unit 1901, configured to store program code and data of the terminal device 1900. For example, when the electronic device 1900 is a user terminal, the storage unit 1901 stores the three-dimensional model data described above.

The processing unit 1902 may be a processor or a controller, such as a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing unit may implement or execute various example logical blocks, modules, and circuits described with reference to content disclosed in this application. The processor may be a combination of processors implementing a computing function, for example, a combination of one or more microprocessors, or a combination of a DSP and a microprocessor. The communication unit 1903 may be a communication interface, a transceiver, a transceiver circuit, or the like. The communication interface is a general term, and may include one or more interfaces. The storage unit 1901 may be a memory.

Figure 20:
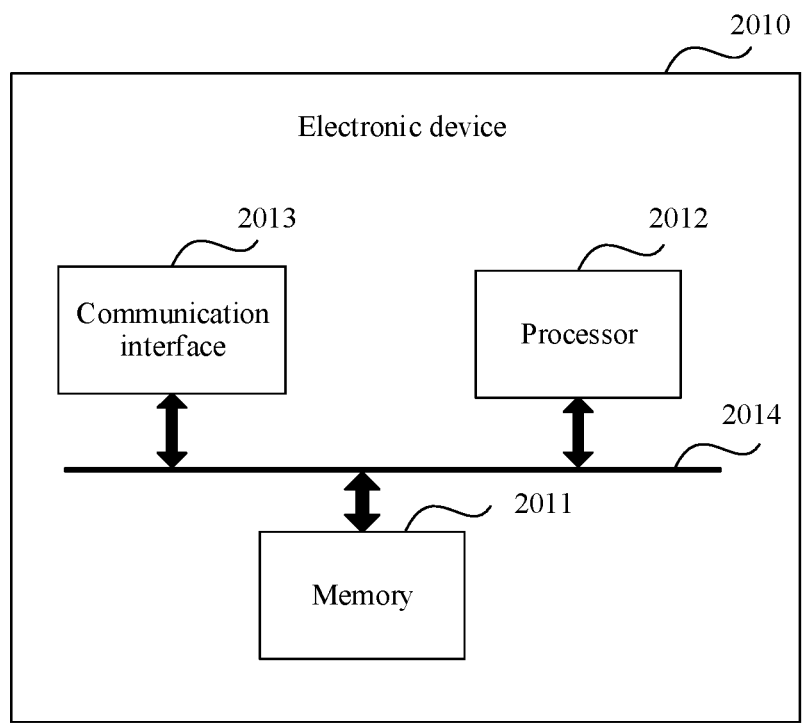
FIG. 20 is a schematic diagram of a structure of an electronic device according to an example embodiment.

When the processing unit 1902 is a processor, the communication unit 1903 is a communication interface, and the storage unit 1901 is a memory, the electronic device in this embodiment of this application may be the electronic device shown in FIG. 20.

As shown in FIG. 20, an electronic device 2010 includes: a processor 2012, a communication interface 2013, and a memory 2011. Optionally, the electronic device 2010 may further include a bus 2014. The communication interface 2013, the processor 2012, and the memory 2011 may be connected by the bus 2014. The bus 2014 may be a peripheral component interconnect (peripheral component interconnect, PCI for short) bus, an extended industry standard architecture (extended industry standard architecture, EISA for short) bus, or the like. The bus 2014 may be classified into an address bus, a data bus, a control bus, or the like. For ease of representation, only one thick line is used to represent the bus in FIG. 20, but this does not mean that there is only one bus or only one type of bus.

The electronic device shown in FIG. 19 or FIG. 20 may be a user terminal or a server.

Methods or algorithm steps described with reference to the content disclosed in embodiments of this application may be implemented by hardware, or may be implemented by a processor executing software instructions. The software instruction may include a corresponding software module (or unit). The software module (or unit) may be stored in a random access memory (Random Access Memory, RAM), a flash memory, a read-only memory (Read-Only Memory, ROM), an erasable programmable read-only memory (Erasable Programmable ROM, EPROM), an electrically erasable programmable read-only memory (Electrically EPROM, EEPROM), a register, a hard disk drive, a removable hard disk, a compact disc read-only memory (Compact Disc Read-Only Memory, CD-ROM), or a storage medium in any other form well known in the art. For example, a storage medium is coupled to a processor, so that the processor can read information from the storage medium and write information into the storage medium. The storage medium may alternatively be a component of the processor. The processor and the storage medium may be in an ASIC. The ASIC may be in an electronic device. The processor and the storage medium may alternatively exist in the electronic device as independent components.

This application further provides a computer program product or a computer program. The computer program product or the computer program includes computer instructions, and the computer instructions are stored in a computer-readable storage medium. A processor of an electronic device reads the computer instructions from the computer-readable storage medium. The processor executes the computer instructions, so that the electronic device performs the foregoing method for presenting object annotation information.

A person skilled in the art should be aware that in the foregoing one or more examples, functions described in embodiments of this application may be implemented by hardware, software, firmware, or any combination thereof. When the functions are implemented by software, the functions may be stored in a computer-readable medium or transmitted as one or more instructions or code in a computer-readable medium. The computer-readable medium includes a computer storage medium and a communication medium, where the communication medium includes any medium that facilitates transmission of a computer program from one place to another. The storage medium may be any available medium accessible to a general-purpose computer or a dedicated computer.

In the foregoing specific implementations, the objectives, technical solutions, and beneficial effect of embodiments of this application is further described in detail. It should be understood that the foregoing descriptions are merely specific implementations of embodiments of this application, but are not intended to limit the protection scope of embodiments of this application. Any modification, equivalent replacement, improvement, or the like made based on the technical solutions of embodiments of this application shall fall within the protection scope of embodiments of this application.

What is claimed is:

1. A method for presenting object annotation information, wherein the method comprises:
    obtaining a target object in a specified scene, wherein the specified scene is a scene presented at a target location;
    determining at least two visible facades of the target object, wherein the at least two visible facades of the target object are presented on a display interface, and each visible facade of the at least two visible facades of the target object is visible to a viewing angle of the target location in exterior facades of the target object;
    selecting, from the at least two visible facades of the target object, an annotation facade of the target object based on projection regions that are for the at least two visible facades and that are presented on the display interface; and
    presenting annotation information of the target object on the annotation facade that is of the target object and that is presented on the display interface, wherein the annotation information of the target object changes as the viewing angle of the target location changes, wherein the change of the viewing angle of the target location is caused by a change of the target location, and wherein the annotation information of the target object indicates a change of a distance to the target object.

2. The method according to claim 1, wherein the specified scene is an augmented reality scene or a virtual reality scene presented at the target location.

3. The method according to claim 1, wherein the annotation facade is one facade that is in the at least two visible facades and whose projection region presented on the display interface has a largest area.

4. The method according to claim 1, wherein the method further comprises:
    obtaining to-be-projected regions of the at least two visible facades based on visible regions of the at least two visible facades, wherein each of the visible regions is a region that is of a corresponding visible facade and that is visible to the target location in the specified scene;
    projecting the to-be-projected regions of the at least two visible facades to the display interface; and
    obtaining projection regions that are for the visible regions of the at least two visible facades and that are presented on the display interface.

5. The method according to claim 4, wherein the obtaining to-be-projected regions of the at least two visible facades based on visible regions of the at least two visible facades comprises:
    obtaining all visible regions of the at least two visible facades, wherein the all visible regions are used as the to-be-projected regions of the at least two visible facades.

6. The method according to claim 1, wherein the presenting annotation information of the target object on the annotation facade that is of the target object and that is presented on the display interface comprises:
    determining an annotation region in a visible region of the annotation facade, wherein the annotation region is of a first shape with a largest area comprised in the visible region of the annotation facade; and
    presenting the annotation information of the target object in the annotation region of the annotation facade presented on the display interface.

7. The method according to claim 6, wherein the determining an annotation region in a visible region of the annotation facade comprises:
    obtaining blockage information of the annotation facade, wherein the blockage information indicates a blocked vertex and a blocked edge of the annotation facade; and
    determining the annotation region in the visible region of the annotation facade based on the blockage information.

8. The method according to claim 6, wherein the presenting annotation information of the target object on the annotation facade that is of the target object and that is presented on the display interface comprises:
    generating a three-dimensional model of the annotation information based on a size of the annotation region; and
    presenting the three-dimensional model of the annotation information on a parallel plane of the annotation region that is presented on the display interface, wherein the parallel plane is a plane in front of the annotation facade and parallel to the annotation facade.

9. The method according to claim 1, wherein the presenting annotation information of the target object on the annotation facade that is of the target object and that is presented on the display interface comprises:
    in response to at least that an area of a projection region that is on the display interface and that is presented by a visible region of the annotation facade is greater than a specified area threshold, presenting the annotation information of the target object on the annotation facade presented on the display interface.

10. The method according to claim 1, wherein one of the at least two visible facades of the target object is partially blocked by an object in the specified scene.

11. An apparatus, comprises:
    at least one processor; and
    at least one processor memory coupled to the at least one processor to store program instructions, which when executed by the processor, cause the at least one processor to:
        obtain a target object in a specified scene, wherein the specified scene is a scene presented at a target location;
        determine at least two visible facades of the target object, wherein the at least two visible facades of the target object are presented on a display interface, and each visible facade of the at least two visible facades of the target object is visible to a viewing angle of the target location in exterior facades of the target object;
        select, from the at least two visible facades of the target object, an annotation facade of the target object based on projection regions that are for the at least two visible facades and that are presented on the display interface; and
        present annotation information of the target object on the annotation facade that is of the target object and that is presented on the display interface, wherein the annotation information of the target object changes as the viewing angle of the target location changes, wherein the change of the viewing angle of the target location is caused by a change of the target location, and wherein the annotation information of the target object indicates a change of a distance to the target object.

12. The apparatus according to claim 11, wherein the specified scene is an augmented reality scene or a virtual reality scene presented at the target location.

13. The apparatus according to claim 11, wherein the annotation facade is one facade that is in the at least two visible facades and whose projection region presented on the display interface has a largest area.

14. The apparatus according to claim 11, wherein the program instructions, when executed by the processor, further cause the at least one processor to:
 obtain to-be-projected regions of the at least two visible facades based on visible regions of the at least two visible facades, wherein each of the visible regions is a region that is of a corresponding visible facade and that is visible to the target location in the specified scene;
 project the to-be-projected regions of the at least two visible facades to the display interface; and
 obtain projection regions that are for the visible regions of the at least two visible facades and that are presented on the display interface.

15. The apparatus according to claim 14, wherein, to obtain to-be-projected regions of the at least two visible facades based on visible regions of the at least two visible facades, the program instructions, when executed by the processor, further cause the at least one processor to:
 obtain all visible regions of the at least two visible facades, wherein the all visible regions are used as the to-be-projected regions of the at least two visible facades.

16. The apparatus according to claim 11, wherein to present annotation information of the target object on the annotation facade that is of the target object and that is presented on the display interface, the program instructions, when executed by the processor, further cause the at least one processor to:
 determine an annotation region in a visible region of the annotation facade, wherein the annotation region is of a first shape with a largest area comprised in the visible region of the annotation facade; and
 present the annotation information of the target object in the annotation region of the annotation facade presented on the display interface.

17. A non-transitory computer-readable storage medium, storing one or more instructions that, when executed by at least one processor, cause the at least one processor to:
 obtain a target object in a specified scene, wherein the specified scene is a scene presented at a target location;
 determine at least two visible facades of the target object, wherein the at least two visible facades of the target object are presented on a display interface, and each visible facade of the at least two visible facades of the target object is visible to a viewing angle of the target location in exterior facades of the target object;
 select, from the at least two visible facades of the target object, an annotation facade of the target object based on projection regions that are for the at least two visible facades and that are presented on the display interface; and
 present annotation information of the target object on the annotation facade that is of the target object and that is presented on the display interface, wherein the annotation information of the target object changes as the viewing angle of the target location changes, wherein the change of the viewing angle of the target location is caused by a change of the target location, and wherein the annotation information of the target object indicates a change of a distance to the target object.

18. The non-transitory computer-readable storage medium according to claim 17, wherein the specified scene is an augmented reality scene or a virtual reality scene presented at the target location.

19. The non-transitory computer-readable storage medium according to claim 17, wherein the annotation facade is one facade that is in the at least two visible facades and whose projection region presented on the display interface has a largest area.

20. The non-transitory computer-readable storage medium according to claim 17, wherein the one or more instructions, when executed by at least one processor, further cause the at least one processor to:
 obtain to-be-projected regions of the at least two visible facades based on visible regions of the at least two visible facades, wherein each of the visible regions is a region that is of a corresponding visible facade and that is visible to the target location in the specified scene; and
 project the to-be-projected regions of the at least two visible facades to the display interface; and
 obtain projection regions that are for the visible regions of the at least two visible facades and that are presented on the display interface.

* * * * *